(12) United States Patent
Matsuoka

(10) Patent No.: US 10,002,184 B2
(45) Date of Patent: Jun. 19, 2018

(54) METHODS AND SYSTEMS FOR IDENTIFICATION AND CORRECTION OF CONTROLLED SYSTEM DATA

(71) Applicant: Google LLC, Mountain View, CA (US)

(72) Inventor: Yoky Matsuoka, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 570 days.

(21) Appl. No.: 14/563,745

(22) Filed: Dec. 8, 2014

(65) Prior Publication Data

US 2015/0161515 A1 Jun. 11, 2015

Related U.S. Application Data

(60) Provisional application No. 61/913,382, filed on Dec. 8, 2013.

(51) Int. Cl.
| | |
|---|---|
| *G05B 13/02* | (2006.01) |
| *G06F 17/30* | (2006.01) |
| *G06N 3/08* | (2006.01) |
| *G05B 15/02* | (2006.01) |

(52) U.S. Cl.
CPC ..... *G06F 17/30663* (2013.01); *G05B 13/027* (2013.01); *G05B 15/02* (2013.01); *G06N 3/084* (2013.01); *G05B 2219/2614* (2013.01); *G05B 2219/2642* (2013.01)

(58) Field of Classification Search
CPC . G06F 17/30663; G05B 13/027; G05B 15/02; G05B 2219/2614; G05B 2219/2642; G06N 3/084
See application file for complete search history.

(56) References Cited

U.S. PATENT DOCUMENTS

| | | | | |
|---|---|---|---|---|
| 6,088,451 | A * | 7/2000 | He | H04L 63/20 380/255 |
| 8,060,389 | B2 * | 11/2011 | Johnson | H04L 69/329 705/6 |
| 2005/0222882 | A1 * | 10/2005 | Aoki | G06Q 10/06395 705/7.41 |
| 2007/0045534 | A1 * | 3/2007 | Zani | B82Y 10/00 250/309 |
| 2008/0305815 | A1 * | 12/2008 | McDonough | H04L 51/38 455/466 |

* cited by examiner

*Primary Examiner* — Alexey Shmaton
*Assistant Examiner* — Tsu-Chang Lee
(74) *Attorney, Agent, or Firm* — Kilpatrick Townsend & Stockton LLP

(57) ABSTRACT

Computational methods and systems that collect operational data from an intelligent controller to identify information, or correct information, about a device and system controlled by the intelligent controller are disclosed. Computational methods and systems use a set of operational data and information known about other devices and systems controlled by similar intelligent controllers to process the operational data and generate information, or correct information, about the device and system.

18 Claims, 33 Drawing Sheets

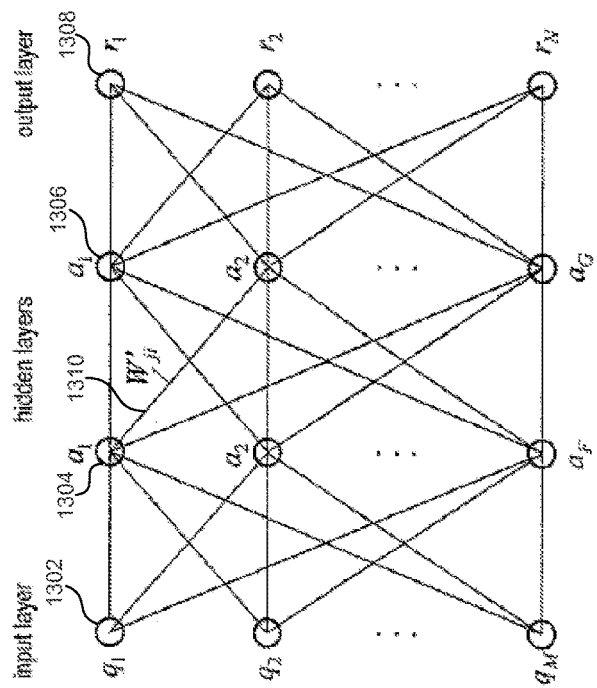

1) Initialize weights
   $W_{ji}^l \in [0,1]$
2) Repeat steps 3) through 10) for corresponding sets of $\bar{Q}$ and $\bar{R}$
   3) Receive inputs and outputs
      $\bar{Q} = [q_1, q_2, ..., q_M]^T$
      $\bar{R} = [r_1, r_2, ..., r_N]^T$
   4) For each node $j$ in the input layer ($l = 1$) do
      $a_j \leftarrow q_j$
   5) For $l = 2$ to $L$ do
      $sum_j \leftarrow \sum_{i=1} W_{ji}^l a_j$
      $a_j \leftarrow h(sum_j)$
   6) For each node $j$ in the output layer ($l = L$) do
      $Error_j = \frac{1}{2}(r_j - a_j)^2$
      $\Delta_j \leftarrow h'(sum_j) \times (r_j - a_j)$
   7) For $l = L - 1$ to 1 do
   8) For each node $j$ in the layer $l$ do
      $\Delta_j \leftarrow h'(sum_j) \times \sum_{i=1} W_{ji}^l \Delta_i$
      9) For each node $j$ in layer $l + 1$ do
         $W_{ji}^l \leftarrow W_{ji}^l + \alpha \times a_j \times \Delta_i$
   10) If for each node $j$ in the output layer
       $Error_j < Error\_threshold$
       then   goto 3)
       else   goto 5)

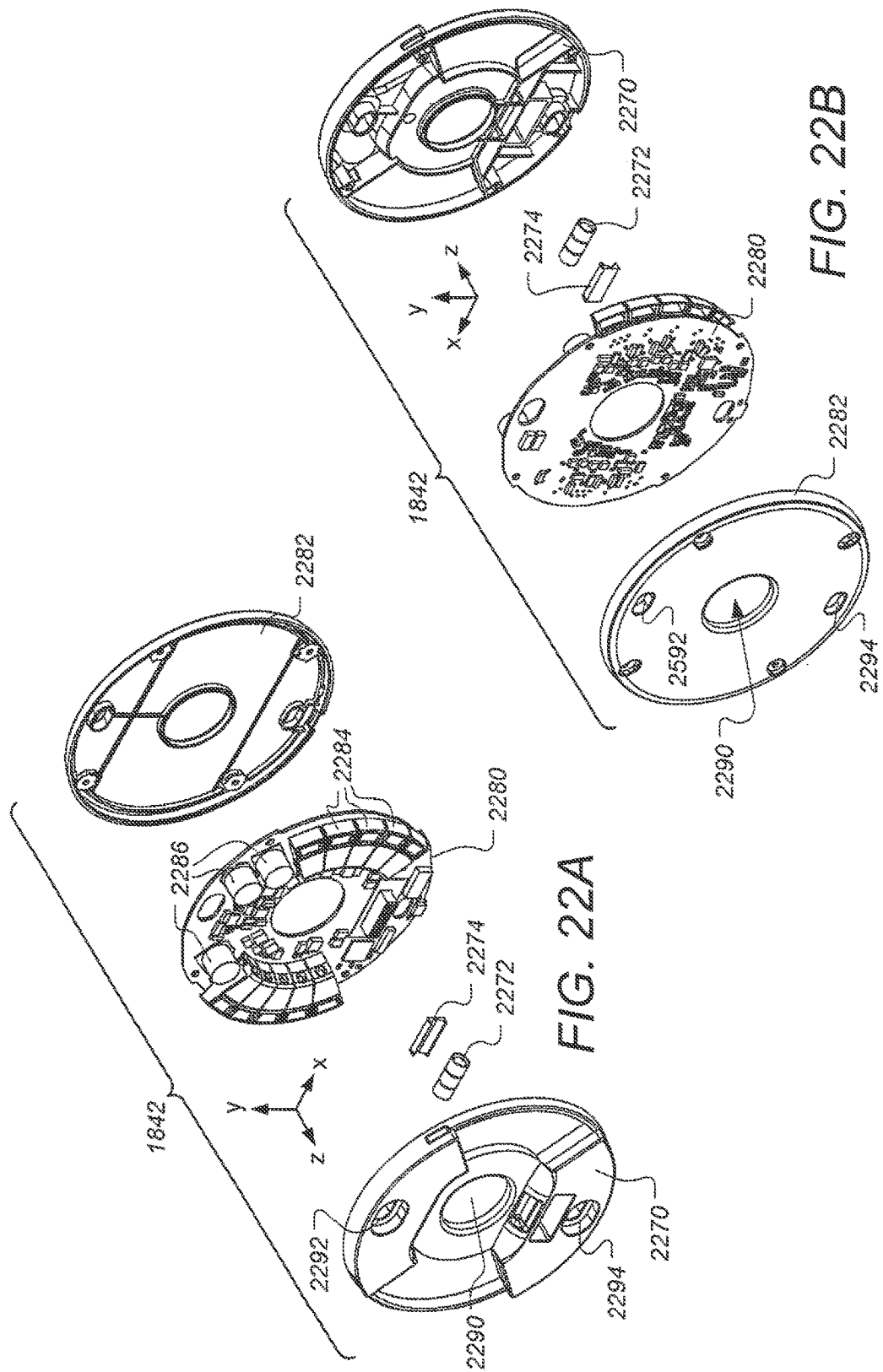

| $\bar{R}$ | registration data |
|---|---|
| $r_1$ | address (e.g., zip code) |
| $r_2$ | home type (e.g., # of floors) |
| $r_3$ | year built |
| $r_4$ | home layout |
| $r_5$ | square footage |
| $r_6$ | HVAC system model(s) |
| $r_7$ | insulation (Rvalue) |
| $r_8$ | date of last filter change |
| $r_9$ | single or double pain windows |

FIG. 25A

| $\bar{Q}$ | operational data |
|---|---|
| $q_1$ | theremostat settings |
| $q_2$ | HVAC system total run time |
| $q_3$ | ave. time to increase temperature from low to high |
| $q_4$ | ave. time to decrease temperature from high to low |
| $q_5$ | ave. time to maintain high temperature setting |
| $q_6$ | ave. time to maintain low temperature setting |
| $q_7$ | ave. time to maintain intermediate temperature setting |
| $q_8$ | ave. time HVAC system is off |
| $q_9$ | ave. rate for temperature increase from low to high |
| $q_{10}$ | ave. rate for temperature increase to maintain temperature setting |
| $q_{11}$ | ave. rate for temperature decrease from high to low |

FIG. 25B

METHODS AND SYSTEMS FOR IDENTIFICATION AND CORRECTION OF CONTROLLED SYSTEM DATA

CROSS-REFERENCES TO RELATED APPLICATIONS

This application claims the benefit of U.S. Provisional Application No. 61/913,382, filed Dec. 8, 2013, the entire contents of which is hereby incorporated herein in its entirety for all purposes.

TECHNICAL FIELD

The present disclosure is directed to computational systems and methods that can be used to identify entities controlled by intelligent controllers based on data about entities collected by other intelligent controllers.

BACKGROUND

Control systems and control theory are well-developed fields of research and development that have had a profound impact on the design and development of a large number of systems and technologies, from airplanes, spacecraft, and other vehicle and transportation systems to computer systems, industrial manufacturing and operations facilities, machine tools, process machinery, and consumer devices. Control theory encompasses a large body of practical, system-control-design principles, but is also an important branch of theoretical and applied mathematics. Various different types of controllers are commonly employed in many different application domains, from simple closed-loop feedback controllers to complex, adaptive, state-space and differential-equations-based processor-controlled control system.

Many controllers are designed to output control signals to various dynamical components of a system based on a control model and sensor feedback from the system. Many systems are designed to exhibit a predetermined behavior or mode of operation, and the control components of the system are therefore designed, by traditional design and optimization techniques, to ensure that the predetermined system behavior transpires under normal operational conditions. However, when little or no specific information regarding the system is known, the controller's control over the system is typically less than optimal. Theoreticians, researchers, and developers of many different types of controllers and automated systems continue to seek approaches that enable controllers to optimize control over systems when little or no information regarding the system is known.

BRIEF SUMMARY

This disclosure is directed to computational methods and systems that collect operational data produced by a first intelligent controller that controls a system and processes the operational data to generate information that can be used to identify, or correct information about, the system and any dynamical components controlled by the first intelligent controller. In particular, the computational methods and systems use a set of operational data associated with a number of similar intelligent controllers and information known about the dynamical components and systems controlled by the similar intelligent controllers to process the operational data associated with the first intelligent controller to identify the unidentified system and any unidentified dynamical components controlled by the first intelligent controller. Computation methods and systems can also use the set of operational data and information known about identified dynamical components and systems to correct inaccuracies in information known about the dynamical component and system controlled by the first intelligent controller. In one exemplary aspect, provided is a method for residential HVAC system identification in which "crowd-sourced" HVAC system data and empirical run data for a population of residences is processed to compute a finite number of HVAC system models, and then empirical run data for a residence in question is processed in conjunction with known HVAC system parameters for the residence in question in view of the finite number of HVAC system models to estimate one or more unknown HVAC system parameters of the residence in question.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 13A illustrates a graph of an example neural network, according to some embodiments.

FIG. 13B presents an example of a pseudocode for multilayer feed-forward neural networks that executes learning through back propagation, according to some embodiments.

FIGS. 22A-22B illustrate exploded front and rear perspective views, respectively, of a backplate of the intelligent thermostat, according to some embodiments.

FIGS. 25A-25B present tables that are examples of the kinds of registration data and operational data that can be collected for an intelligent thermostat, according to some embodiments.

DETAILED DESCRIPTION

The current disclosure is directed to computational methods and systems for identifying unidentified controlled systems using information provided by a general class of intelligent controllers that includes many different specific types of intelligent controllers that can be applied to, and incorporated within, the controlled systems. Intelligent controllers control the operation of devices, machines, systems, and organizations. The general class of intelligent controllers to which the current disclosure is directed include automated learning components that allow the intelligent controllers to learn desired operational behaviors of the devices, machines, systems, and organizations which they control and incorporate the learned information into control schedules.

The current disclosure presents, in addition to methods and implementations for identifying unidentified controlled systems, a specific example of an intelligent thermostat controller, or intelligent thermostat, and methods employed by the general class of intelligent controllers to which the current disclosure is directed. The intelligent thermostat is presented as an example of an intelligent controller.

The detailed description includes four subsections: (1) an overview of the smart-home environment; (2) automated control-schedule learning; (3) methods for identifying unidentified controlled systems; and (4) an intelligent thermostat as an example of an intelligent controller.

Overview of the Smart-Home Environment

Figure 1:
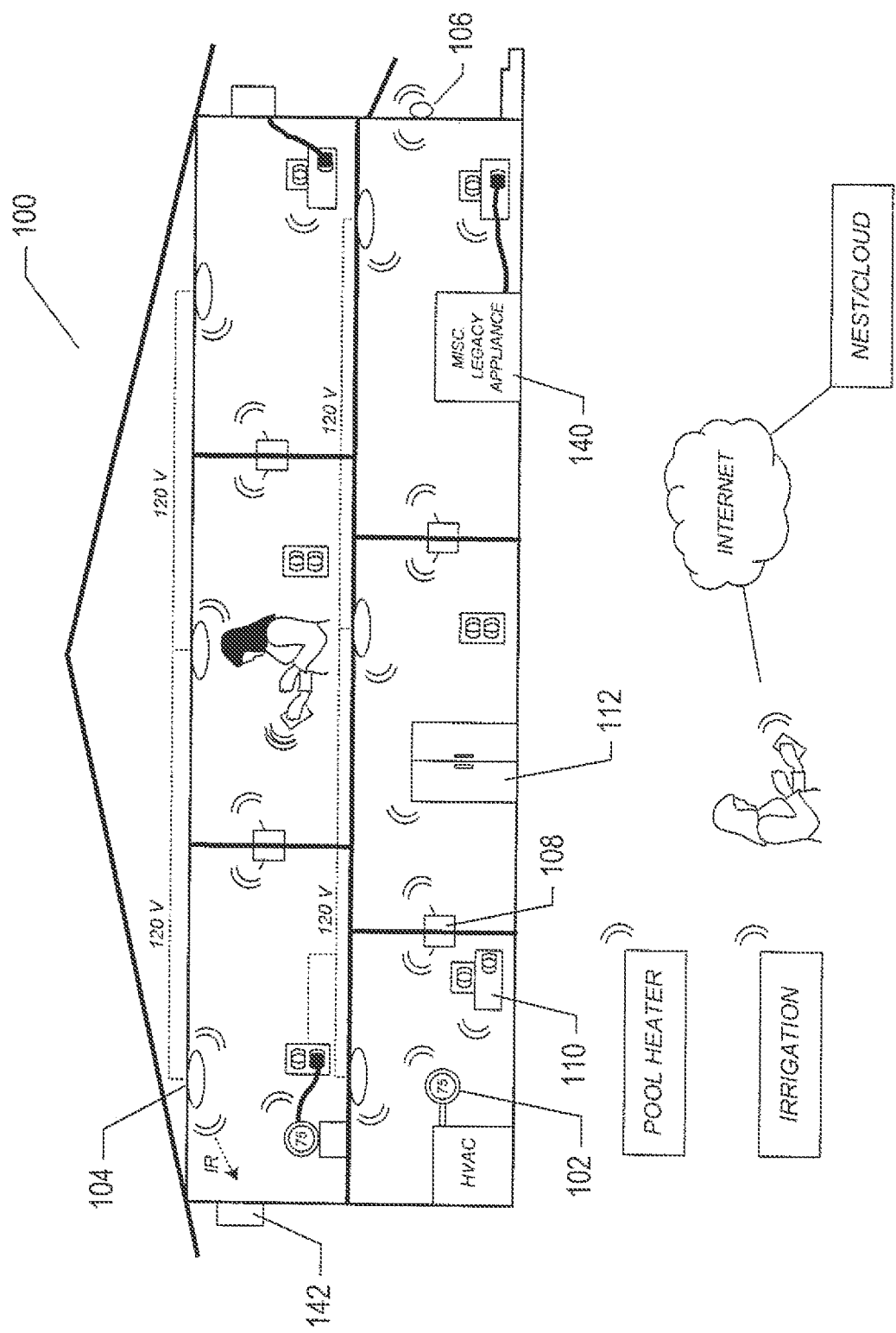
FIG. 1 illustrates a smart-home environment, according to some embodiments.

FIG. 1 illustrates a smart-home environment. The smart-home environment 100 includes a number of intelligent, multi-sensing, network-connected devices. These intelligent controllers intercommunicate and are integrated together within the smart-home environment. The intelligent controllers may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

The intelligent controllers may include one or more intelligent thermostats 102, one or more intelligent hazard-detection units 104, one or more intelligent entryway-interface devices 106, smart switches, including smart wall-like switches 108, smart utilities interfaces and other services interfaces, such as smart wall-plug interfaces 110, and a wide variety of intelligent, multi-sensing, network-connected appliances 112, including refrigerators, televisions, washers, dryers, lights, audio systems, intercom systems, mechanical actuators, wall air conditioners, pool-heating units, irrigation systems, and many other types of intelligent appliances and systems.

In general, intelligent controllers include one or more different types of sensors, one or more controllers and/or actuators, and one or more communications interfaces that connect the intelligent controllers to other intelligent controllers, routers, bridges, and hubs within a local smart-home environment, various different types of local computer systems, and to the Internet, through which a intelligent controller may communicate with cloud-computing servers and other remote computing systems. Data communications are generally carried out using any of a large variety of different types of communications media and protocols, including wireless protocols, such as Wi-Fi, ZigBee, 6 LoWPAN, various types of wired protocols, including CAT6 Ethernet, HomePlug, and other such wired protocols, and various other types of communications protocols and technologies. Intelligent controllers may themselves operate as intermediate communications devices, such as repeaters, for other intelligent controllers. The smart-home environment may additionally include a variety of different types of legacy appliances and devices 140 and 142 which lack communications interfaces and processor-based controllers.

Figure 2:
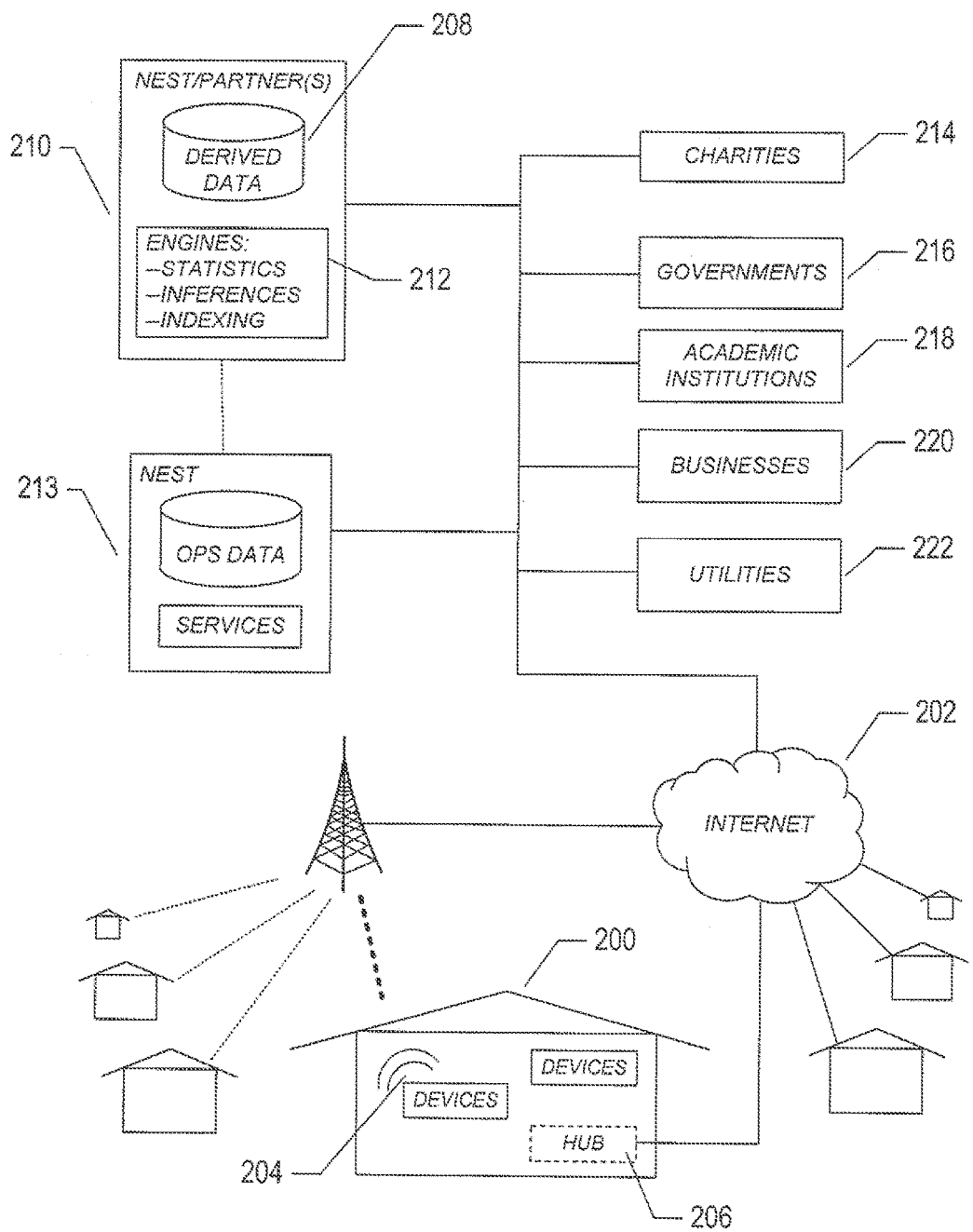
FIG. 2 illustrates integration of intelligent controllers with remote devices and systems according to some embodiments.

FIG. 2 illustrates integration of intelligent controllers with remote devices and systems. Intelligent controllers within a smart-home environment 200 can communicate through the Internet 202 via 3G/4G wireless communications 204, through a hubbed network 206, or by other communications interfaces and protocols. Many different types of smart-home-related data, and data derived from smart-home data 208, can be stored in, and retrieved from, a remote system 210, including a cloud-based remote system. The remote system 210 may include various types of statistics, inference, and indexing engines 212 for data processing and derivation of additional information and rules related to the smart-home environment. The stored data can be exposed, via one or more communications media and protocols, in part or in whole, to various remote systems and organizations, including charities 214, governments 216, academic institutions 218, businesses 220, and utilities 222. In general, the remote data-processing system 210 is managed or operated by an organization or vendor related to intelligent controllers or contracted for remote data-processing and other services by a homeowner, landlord, dweller, or other smart-home-associated user. The data may also be further processed by additional commercial-entity data-processing systems 213 on behalf of the smart-homeowner or manager and/or the commercial entity or vendor which operates the remote data-processing system 210. Thus, external entities 210 and 213 may collect, process, and expose information collected by intelligent controllers within a smart-home environment, may process the information to produce various types of derived results which may be communicated to, and shared with, other remote entities 214, 216, 218, 220, and 222, and may participate in monitoring and control of intelligent controllers within the smart-home environment as well as monitoring and control of the smart-home environment. Of course, in many cases, export of information from within the smart-home environment to remote entities may be strictly controlled and constrained, using encryption, access rights, authentication, and other well-known techniques, to ensure that information deemed confidential by the smart-home manager and/or by the remote data-processing system is not intentionally or unintentionally made available to additional external computing facilities, entities, organizations, and individuals.

Figure 3:
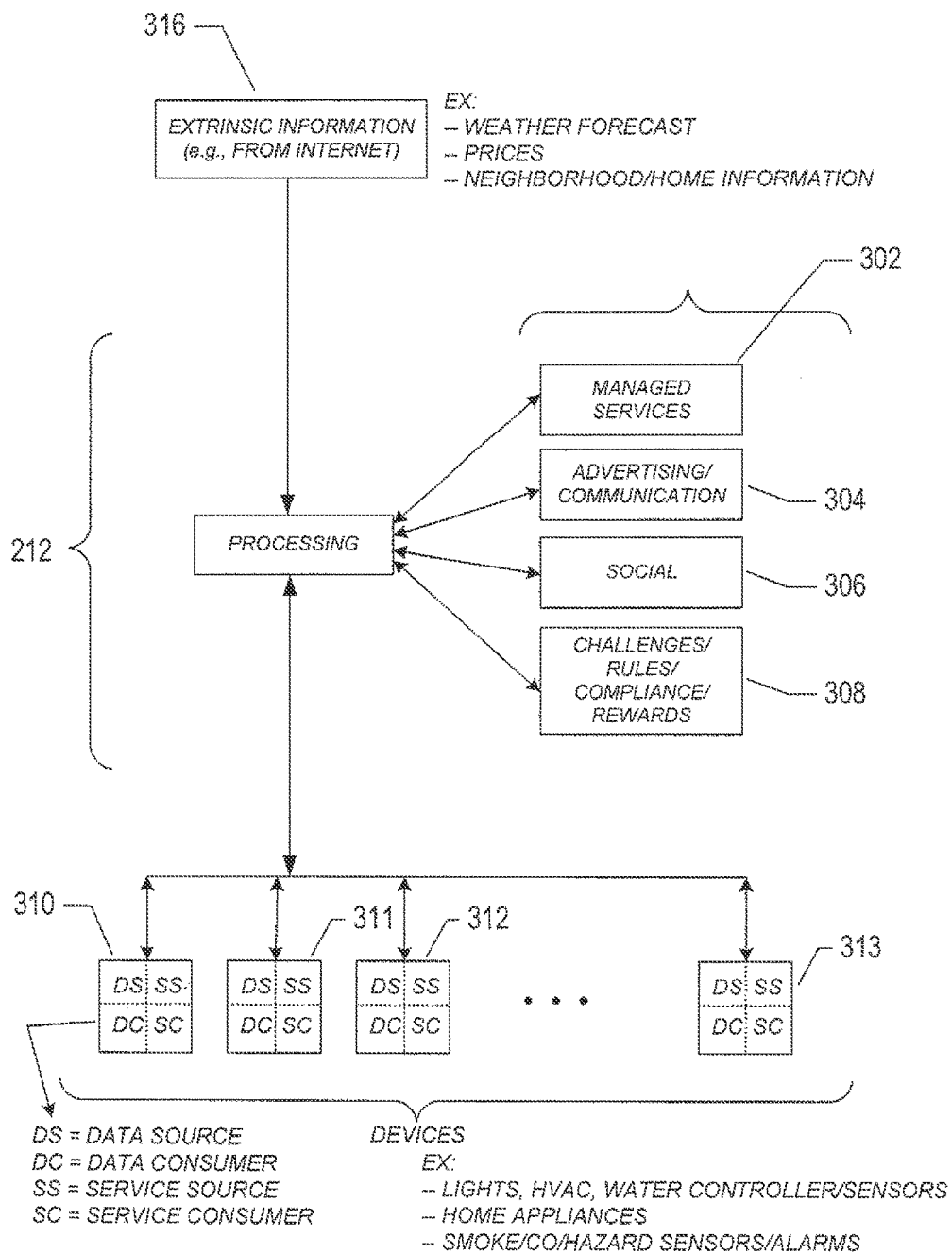
FIG. 3 illustrates information processing within the environment of intercommunicating entities illustrated in FIG. 2, according to some embodiments.

FIG. 3 illustrates information processing within the environment of intercommunicating entities illustrated in FIG. 2. The various processing engines 212 within the external data-processing system 210 can process data with respect to a variety of different goals, including provision of managed services 302, various types of advertising and communications 304, social-networking exchanges and other electronic social communications 306, and for various types of monitoring and rule-generation activities 308. The various processing engines 212 communicate directly or indirectly with intelligent controllers 310-313, each of which may have data-consumer ("DC"), data-source ("DS"), services-consumer ("SC"), and services-source ("SS") characteristics. In addition, the processing engines may access various other types of external information 316, including information obtained through the Internet, various remote information sources, and even remote sensor, audio, and video feeds and sources.

Automated Schedule Learning

Figure 4:
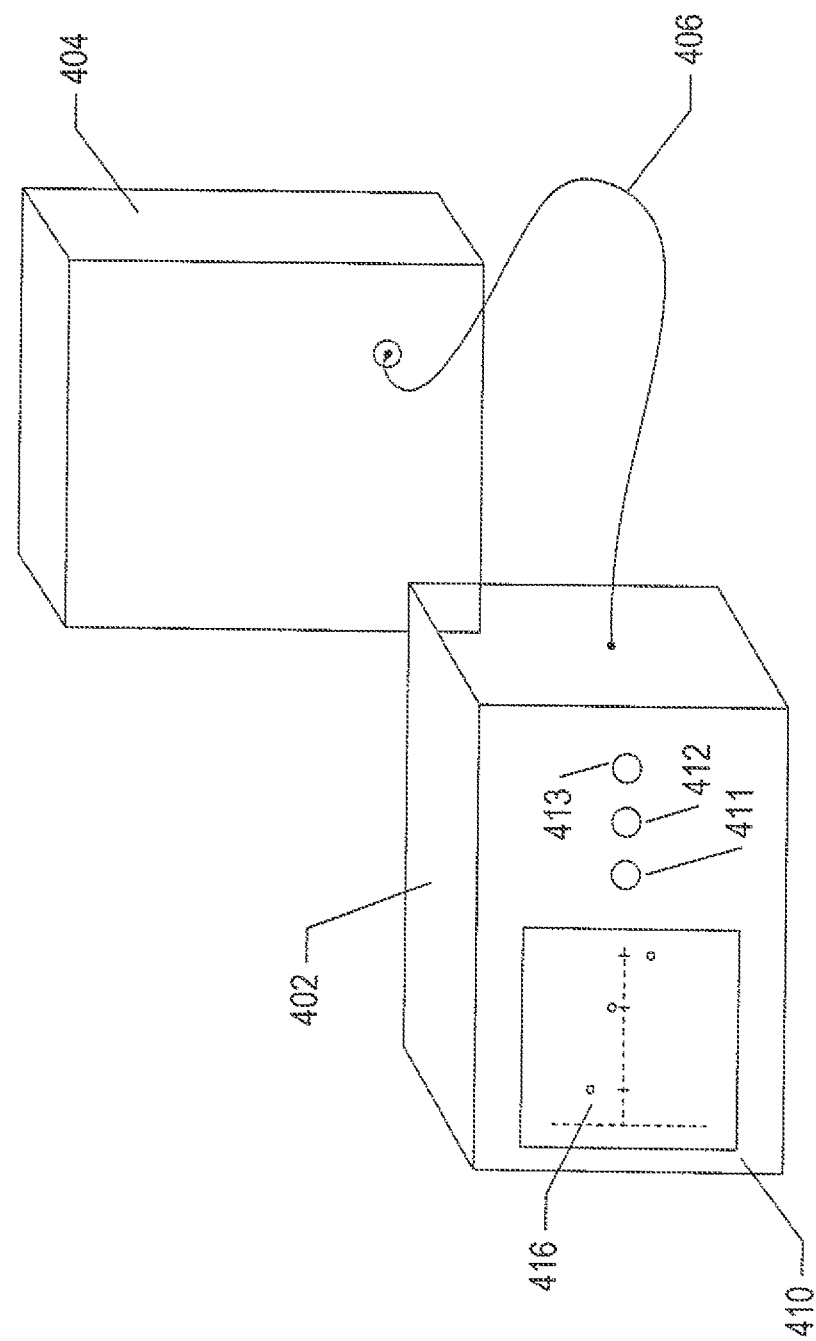
FIG. 4 illustrates a general class of intelligent controllers, according to some embodiments.

FIG. 4 illustrates a general class of intelligent controllers. The intelligent controller 402 controls a controlled entity 404, such as a device, machine, system, or organization 404, via any of various different types of output control signals and receives information about the controlled entity and the environment from sensor output received by the intelligent controller 402 from sensors embedded within the controlled entity 404, the intelligent controller 402, or in the environment of the intelligent controller 402 and/or controlled entity 404. In FIG. 4, the intelligent controller 402 is shown connected to the controlled entity 404 via a wire or fiber-based communications medium 406. However, the intelligent controller 402 may be interconnected with the controlled entity by alternative types of communications media and communications protocols, including wireless communications. In many cases, the intelligent controller 402 and controlled entity 404 may be implemented and packaged together as a single system that includes both the intelligent controller and the controlled entity. The controlled entity 404 may include multiple devices, machines, system, or organizations and the intelligent controller 402 may itself be distributed among multiple components and discrete devices and systems. In addition to outputting control signals to controlled entities and receiving sensor input, the intelligent controller 402 also provides a user interface 410-413 through which a human user or remote entity, including a user-operated processing device or a remote automated control system, can input immediate-control inputs to the intelligent controller 402 as well as create and modify various types of control schedules. In FIG. 4, the intelligent controller 402 provides a graphical-display component 410 that displays a control schedule 416 and includes a number of input components 411-413 that provide a user interface for input of immediate-control directives to the intelligent controller for controlling the controlled entity 404 or entities and input of scheduling-interface commands that control display of one or more control schedules, creation of control schedules, and modification of control schedules.

To summarize, the general class of intelligent controllers receive sensor input, output control signals to one or more controlled entities, and provide a user interface that allows users to input immediate-control command inputs to the intelligent controller for translation by the intelligent controller into output control signals as well as to create and modify one or more control schedules that specify desired controlled-entity operational behavior over one or more time periods. These basic functionalities and features of the general class of intelligent controllers provide a basis upon which automated control-schedule learning, to which the current application is directed, can be implemented.

Figure 5:
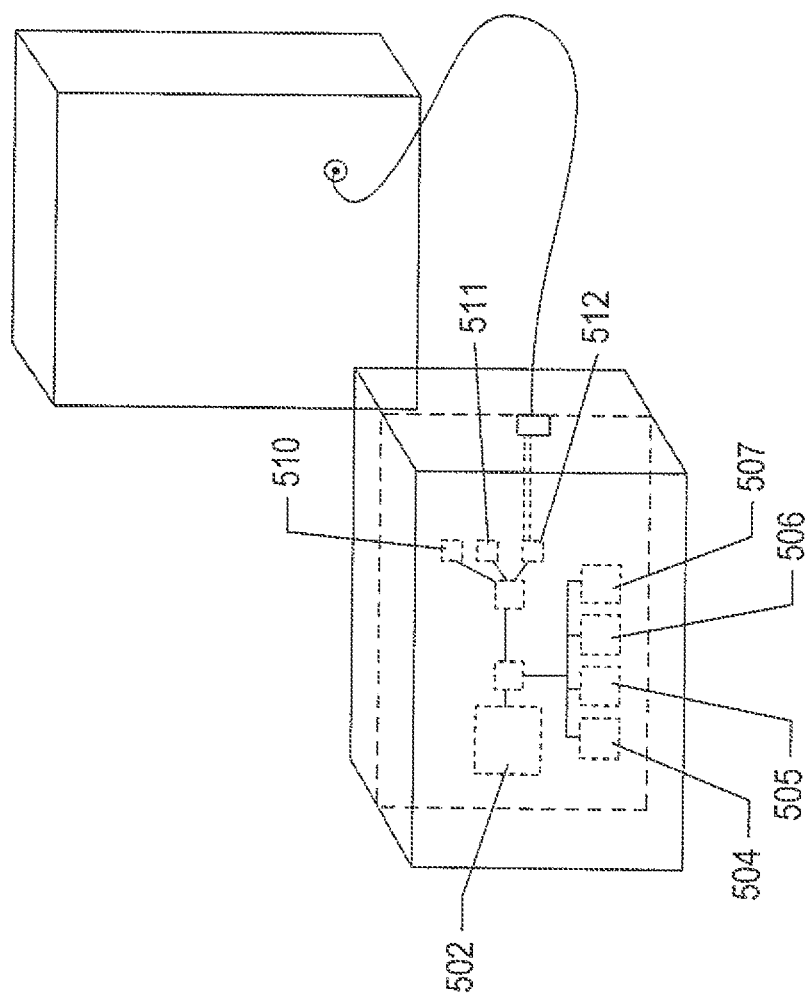
FIG. 5 illustrates additional internal features of an intelligent controller, according to some embodiments.

FIG. 5 illustrates additional internal features of an intelligent controller. An intelligent controller is generally implemented using one or more processors 502, electronic memory 504-507, and various types of microcontrollers 510-512, including a microcontroller 512 and transceiver 514 that together implement a communications port that allows the intelligent controller to exchange data and commands with one or more entities controlled by the intelligent controller, with other intelligent controllers, and with various remote computing facilities, including cloud-computing facilities through cloud-computing servers. Often, an intelligent controller includes multiple different communications ports and interfaces for communicating by various different protocols through different types of communications media. It is common for intelligent controllers, for example, to use wireless communications to communicate with other wireless-enabled intelligent controllers within an environment and with mobile-communications carriers as well as any of various wired communications protocols and media. In certain cases, an intelligent controller may use only a single type of communications protocol, particularly when packaged together with the controlled entities as a single system. Electronic memories within an intelligent controller may include both volatile and non-volatile memories, with low-latency, high-speed volatile memories facilitating execution of machine-readable control routines by the one or more processors and slower, non-volatile memories storing machine-readable control routines and data that need to survive power-on/power-off cycles. Certain types of intelligent controllers may additionally include mass-storage devices.

Figure 6:
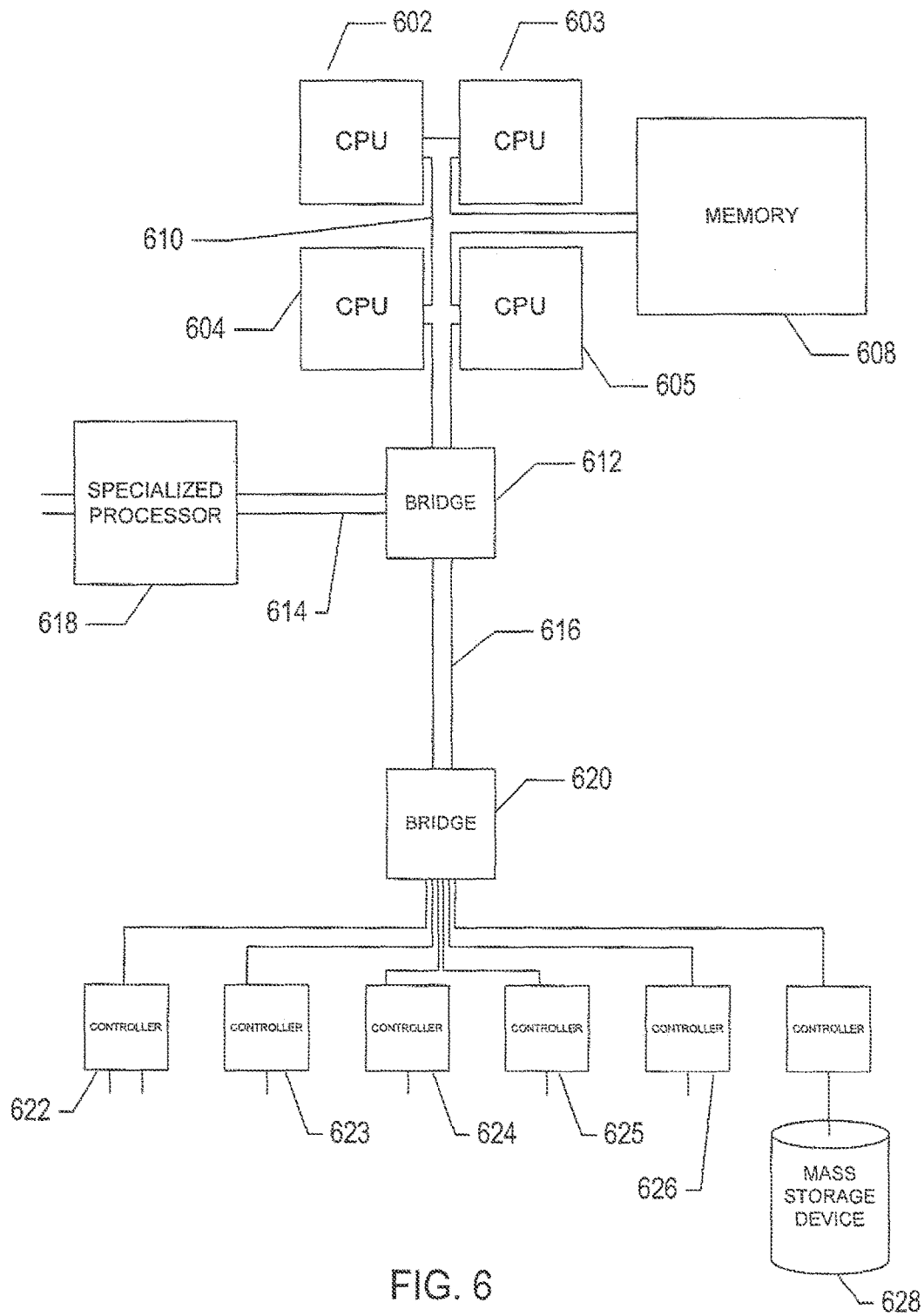
FIG. 6 illustrates a generalized computer architecture that represents an example of the type of computing machinery that may be included in an intelligent controller, server computer, and other processor-based intelligent controllers and cloud-based systems, according to some embodiments.

FIG. 6 illustrates a generalized computer architecture that represents an example of the type of computing machinery that may be included in an intelligent controller, server computer, and other processor-based intelligent controllers and cloud-based systems. The computing machinery includes one or multiple central processing units ("CPUs") 602-605, one or more electronic memories 608 interconnected with the CPUs by a CPU/memory-subsystem bus 610 or multiple busses, a first bridge 612 that interconnects the CPU/memory-subsystem bus 610 with additional busses 614 and 616 and/or other types of high-speed interconnection media, including multiple, high-speed serial interconnects. These busses and/or serial interconnections, in turn, connect the CPUs and memory with specialized processors, such as a graphics processor 618, and with one or more additional bridges 620, which are interconnected with high-speed serial links or with multiple controllers 622-627, such as controller 627, that provide access to various different types of mass-storage devices 628, electronic displays, input devices, and other such components, subcomponents, and computational resources.

Figure 7:
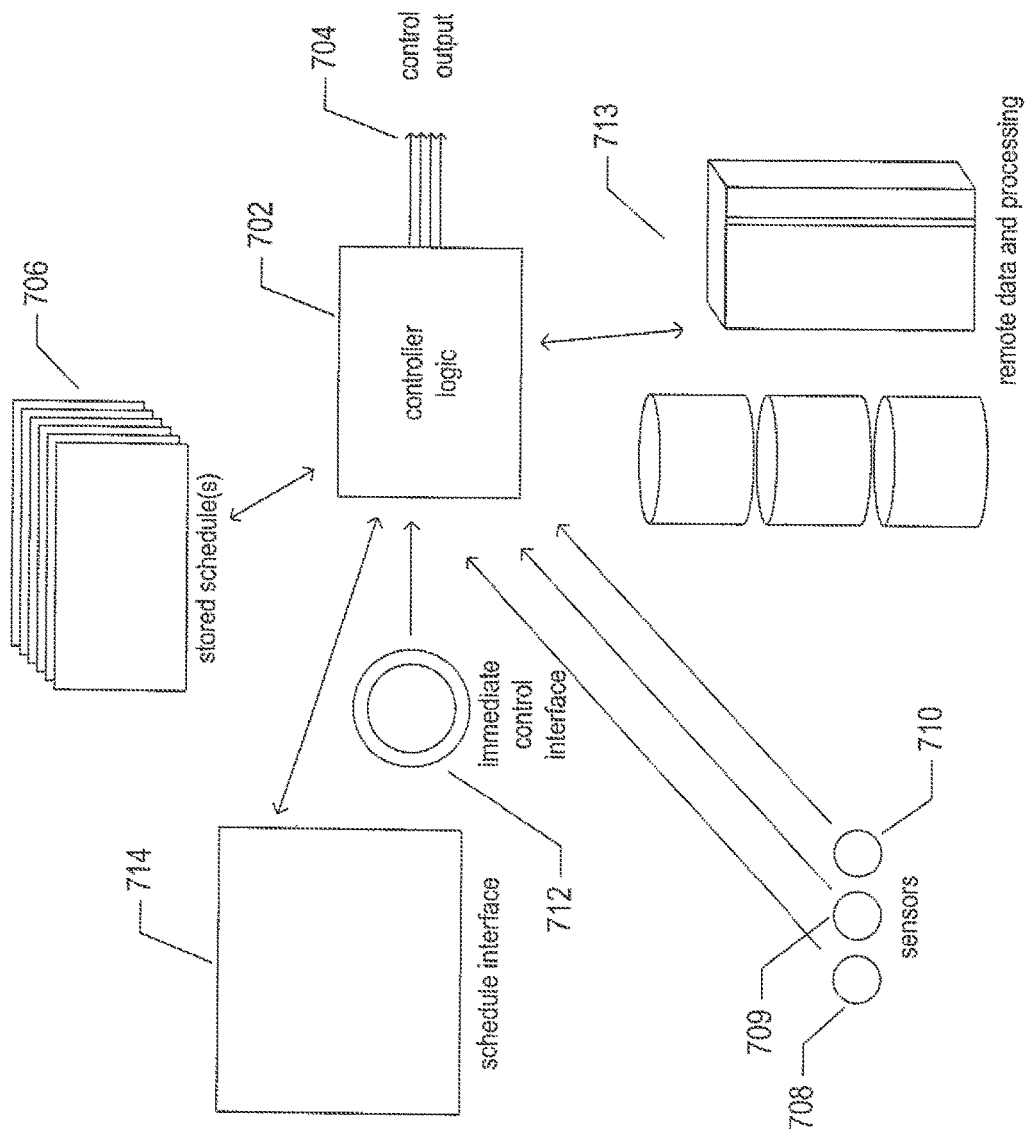
FIG. 7 illustrates features and characteristics of an intelligent controller of the general class of intelligent controllers, according to some embodiments.

FIG. 7 illustrates features and characteristics of an intelligent controller of the general class of intelligent controllers. An intelligent controller includes controller logic 702 generally implemented as electronic circuitry and processor-based computational components controlled by computer instructions stored in physical data-storage components, including various types of electronic memory and/or mass-storage devices. It should be noted, at the onset, that computer instructions are machine-readable instructions stored in physical data-storage devices and executed within processors comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors are physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data-storage devices.

The controller logic 702 accesses and uses a variety of different types of stored information and inputs in order to generate output control signals 704 that control the operational behavior of one or more controlled entities. The information used by the controller logic may include one or more stored control schedules 706, received output from one or more sensors 708-710, immediate control inputs received through an immediate-control interface 712, and data, commands, and other information received from remote data-processing systems, including cloud-based data-processing systems 713. In addition to generating control output 704, the controller logic 702 provides an interface 714 that allows users to create and modify control schedules and may also output data and information to remote entities, other intelligent controllers, and to users through an information-output interface.

Figure 8:
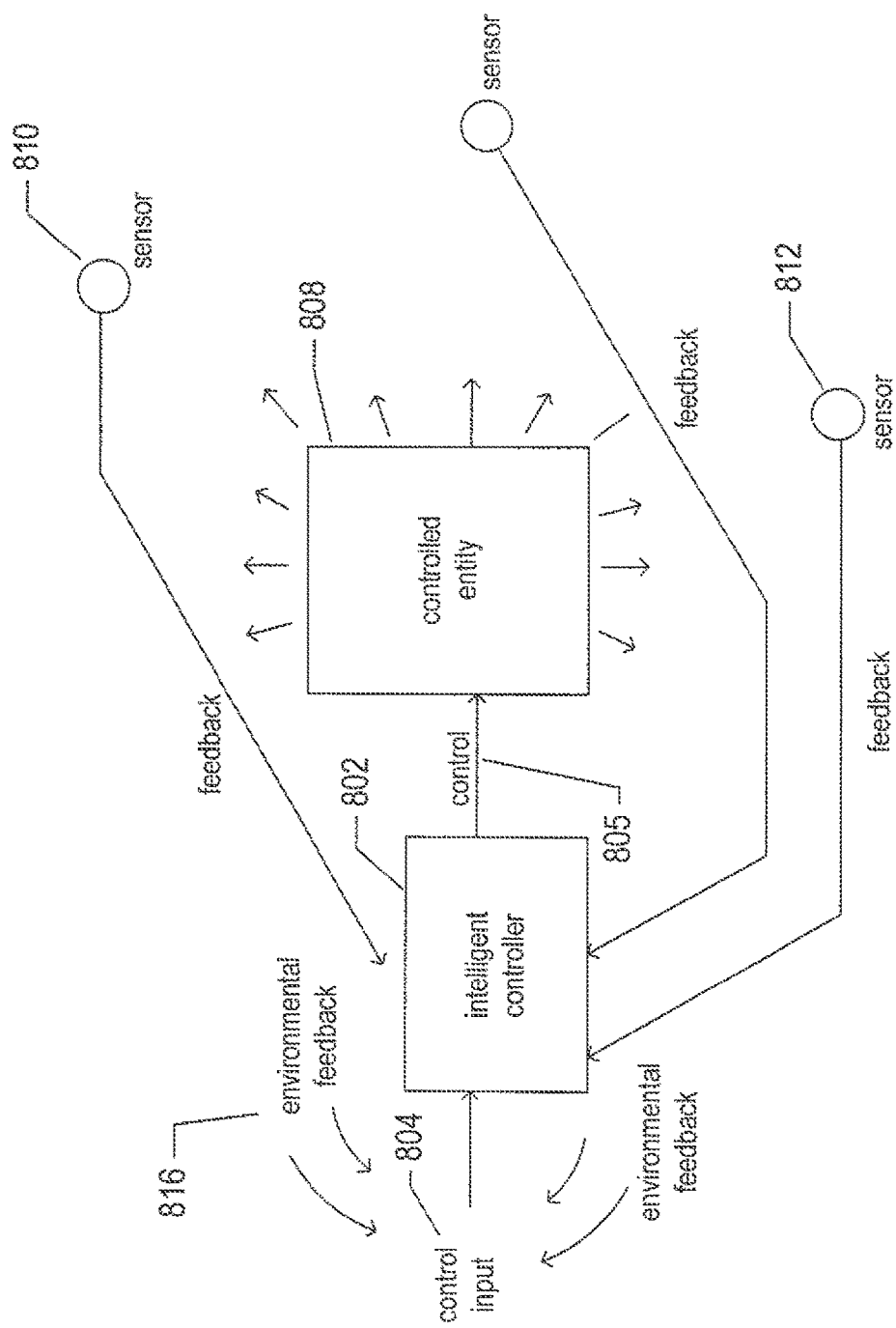
FIG. 8 illustrates a typical control environment within which an intelligent controller operates, according to some embodiments.

FIG. 8 illustrates a typical control environment within which an intelligent controller operates. As discussed above, an intelligent controller 802 receives control inputs from users or other entities 804 and uses the control inputs, along with stored control schedules and other information, to generate output control signals 805 that control operation of one or more controlled entities 808. Operation of the controlled entities may alter an environment within which sensors 810-812 are embedded. The sensors return sensor output, or feedback, to the intelligent controller 802. Based on this feedback, the intelligent controller 802 modifies the output control signals 805 in order to achieve a specified goal or goals for controlled-system operation. In essence, an intelligent controller modifies the output control signals according to two different feedback loops. The first, most direct feedback loop includes output from sensors that the controller can use to determine subsequent output control signals or control-output modification in order to achieve the desired goal for controlled-system operation. In many cases, a second feedback loop involves environmental or other feedback 816 to users which, in turn, elicits subsequent user control and scheduling inputs to the intelligent controller 802. In other words, users can either be viewed as another type of sensor that outputs immediate-control directives and control-schedule changes, rather than raw sensor output, or can be viewed as a component of a higher-level feedback loop.

Figure 9:
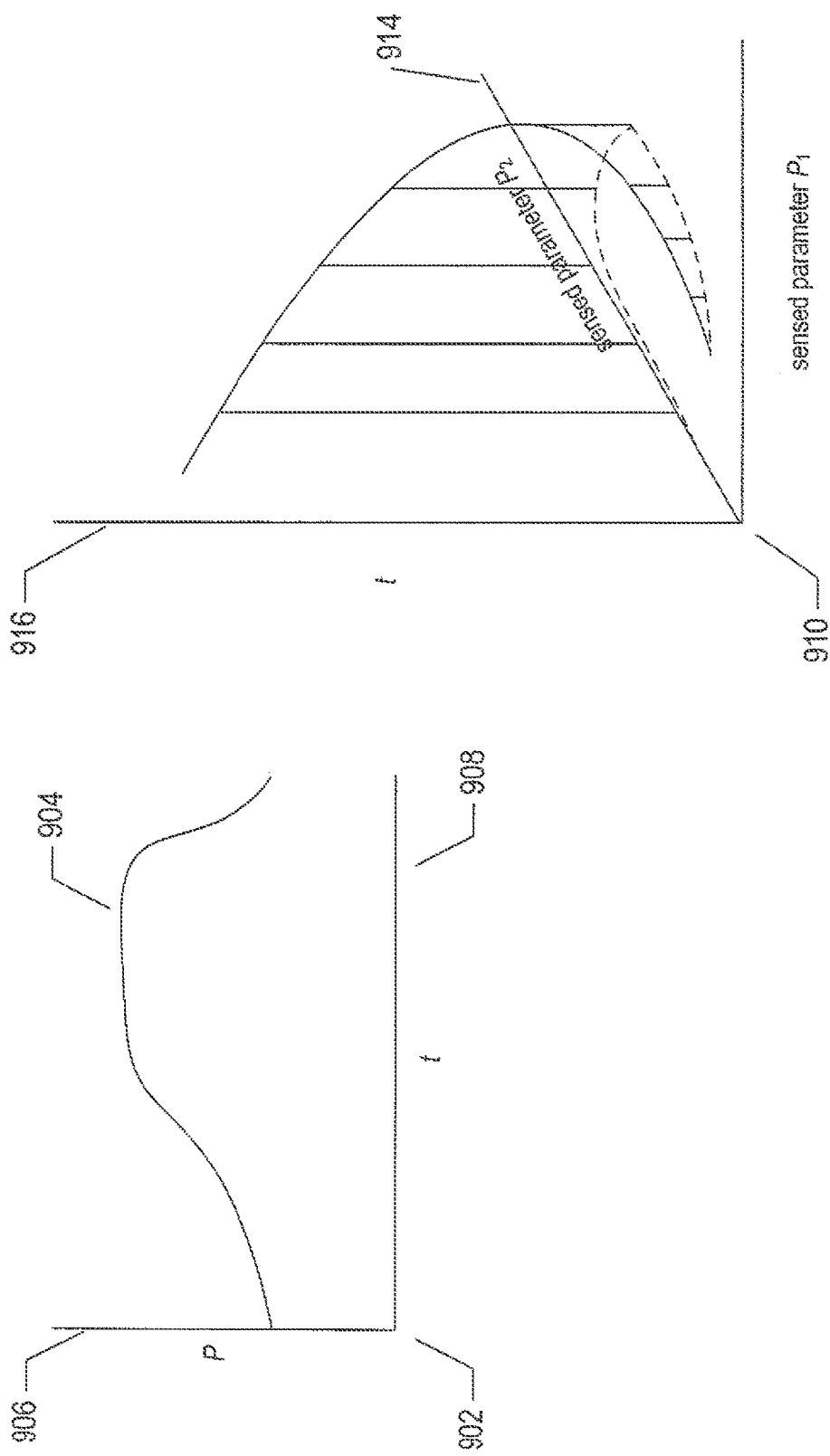
FIG. 9 illustrates the general characteristics of sensor output, according to some embodiments.

There are many different types of sensors and sensor output. In general, sensor output is directly or indirectly related to some type of parameter, machine state, organization state, computational state, or physical environmental parameter. FIG. 9 illustrates the general characteristics of sensor output. As shown in a first plot 902 in FIG. 9, a sensor may output a signal, represented by curve 904, over time t, with the signal directly or indirectly related to a parameter P, plotted with respect to the vertical axis 906. The sensor may output a signal continuously or at intervals, with the time of output plotted with respect to the horizontal axis 908. In certain cases, sensor output may be related to two or more parameters. For example, in plot 910, a sensor outputs values directly or indirectly related to two different parameters $P_1$ and $P_2$, plotted with respect to axes 912 and 914, respectively, over time, plotted with respect to vertical axis 916. In the following discussion, for simplicity of illustration and discussion, it is assumed that sensors produce output directly or indirectly related to a single parameter, as in plot 902 in FIG. 9. In the following discussion, the sensor output is assumed to be a set of parameter values for a parameter P. The parameter may be related to environmental conditions, such as temperature, ambient light level, sound level, and other such characteristics. However, the parameter may also be the position or positions of machine components, the data states of memory-storage address in data-storage devices, the current drawn from a power supply, the flow rate of a gas or fluid, the pressure of a gas or fluid, and many other types of parameters that comprise useful information for control purposes.

Figure 10A:
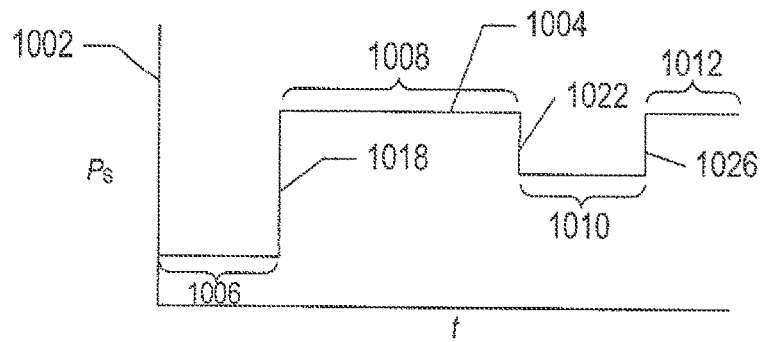
FIGS. 10A-10D illustrate information processed and generated by an intelligent controller during control operations, according to some embodiments.

FIGS. 10A-10D illustrate information processed and generated by an intelligent controller during control operations. All the figures show plots, similar to plot 902 in FIG. 9, in which values of a parameter or another set of control-related values are plotted with respect to a vertical axis and time is plotted with respect to a horizontal axis. FIG. 10A shows an idealized specification for the results of controlled-entity operation. The vertical axis 1002 in FIG. 10A represents a specified parameter value, $P_s$. For example, in the case of an intelligent thermostat, the specified parameter value may be temperature. For an irrigation system, by contrast, the specified parameter value may be flow rate. FIG. 10A is the plot of a continuous curve 1004 that represents desired parameter values, over time, that an intelligent controller is directed to achieve through control of one or more devices, machines, or systems. The specification indicates that the parameter value is desired to be initially low 1006, then rise to a relatively high value 1008, then subside to an intermediate value 1010, and then again rise to a higher value 1012. A control specification can be visually displayed to a user, as one example, as a control schedule.

Figure 10B:
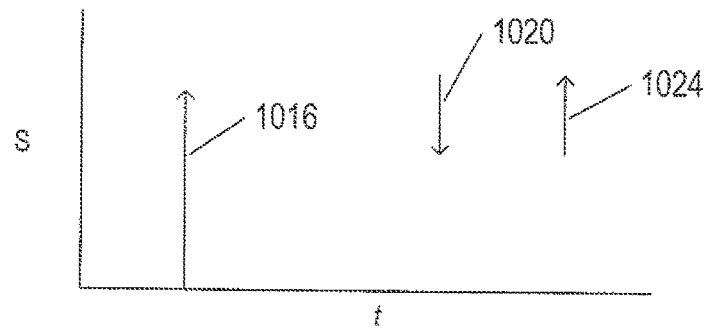

FIG. 10B shows an alternate view, or an encoded-data view, of a control schedule corresponding to the control specification illustrated in FIG. 10A. The control schedule includes indications of a parameter-value increase 1016 corresponding to edge 1018 in FIG. 10A, a parameter-value decrease 1020 corresponding to edge 1022 in FIG. 10A, and a parameter-value increase 1024 corresponding to edge 1026 in FIG. 10A. The directional arrows plotted in FIG. 10B can be considered to be setpoints, or indications of desired parameter changes at particular points in time within some period of time.

The control schedules learned by an intelligent controller represent a significant component of the results of automated learning. The learned control schedules may be encoded in various different ways and stored in electronic memories or mass-storage devices within the intelligent controller, within the system controlled by the intelligent controller, or within remote data-storage facilities, including cloud-computing-based data-storage facilities. In many cases, the learned control schedules may be encoded and stored in multiple locations, including control schedules distributed among internal intelligent-controller memory and remote data-storage facilities. A setpoint change may be stored as a record with multiple fields, including fields that indicate whether the setpoint change is a system-generated setpoint or a user-generated setpoint, whether the setpoint change is an immediate-control-input setpoint change or a scheduled setpoint change, the time and date of creation of the setpoint change, the time and date of the last edit of the setpoint change, and other such fields. In addition, a setpoint may be associated with two or more parameter values. As one example, a range setpoint may indicate a range of parameter values within which the intelligent controller should maintain a controlled environment. Setpoint changes are often referred to as "setpoints."

Figure 10C:
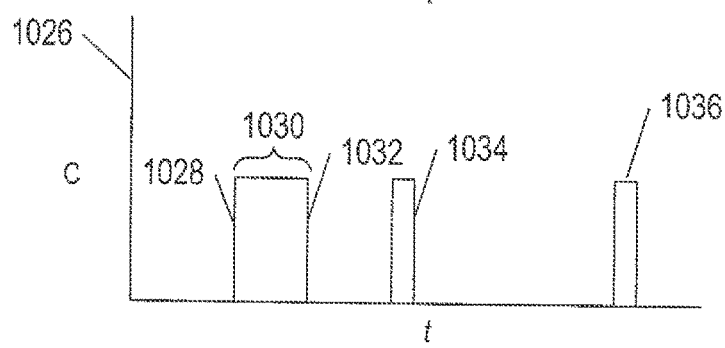

FIG. 10C illustrates a control output by an intelligent controller that might result from the control schedule illustrated in FIG. 10B. In this figure, the magnitude of an output control signal S is plotted with respect to the vertical axis 1026. For example, the control output may be a voltage signal output by an intelligent thermostat to a heating unit, with a high-voltage signal indicating that the heating unit should be currently operating and a low-voltage output indicating that the heating system should not be operating. Edge 1028 in FIG. 10C corresponds to setpoint 1016 in FIG. 10B. The width of the positive control output 1030 may be related to the length, or magnitude, of the desired parameter-value change, indicated by the length of setpoint arrow 1016. When the desired parameter value is obtained, the intelligent controller discontinues output of a high-voltage signal, as represented by edge 1032. Similar positive output control signals 1034 and 1036 are elicited by setpoints 1020 and 1024 in FIG. 10B.

Figure 10D:
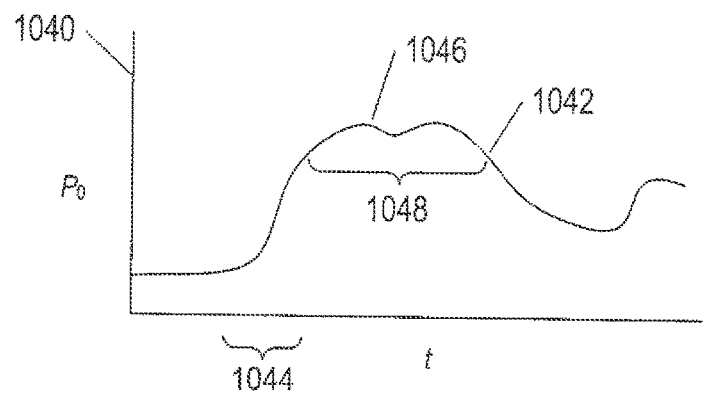

Finally, FIG. 10D illustrates the observed parameter changes, as indicated by sensor output, resulting from control, by the intelligent controller, of one or more controlled entities. In FIG. 10D, the sensor output, directly or indirectly related to the parameter $P_0$, is plotted with respect to the vertical axis 1040. The observed parameter value is represented by a smooth, continuous curve 1042. Although this continuous curve can be seen to be related to the initial specification curve, plotted in FIG. 10A, the observed curve does not exactly match that specification curve. First, it may take a finite period of time 1044 for the controlled entity to achieve the parameter-valued change represented by setpoint 1016 in the control schedule plotted in FIG. 10B. Also, once the parameter value is obtained, and the controlled entity directed to discontinue operation, the parameter value may begin to fall 1046, resulting in a feedback-initiated control output to resume operation of the controlled entity in order to maintain the desired parameter value. Thus, the desired high-level constant parameter value 1008 in FIG. 10A may, in actuality, end up as a time-varying curve 1048 that does not exactly correspond to the control specification 1004. The first level of feedback, discussed above with reference to FIG. 8, is used by the intelligent controller to control one or more control entities so that the observed parameter value, over time, as illustrated in FIG. 10D, matches the specified time behavior of the parameter in FIG. 10A as closely as possible. The second level feedback control loop, discussed above with reference to FIG. 8, may involve alteration of the control specification, illustrated in FIG. 10A, by a user, over time, either by changes to stored control schedules or by input of immediate-control directives, in order to generate a modified control specification that produces a parameter-value/time curve reflective of a user's desired operational results.

There are many types of controlled entities and associated intelligent controllers. In certain cases, control output may include both an indication of whether the controlled entity should be currently operational as well as an indication of a level, throughput, or output of operation when the controlled entity is operational. In other cases, the control output may be simply a binary activation/deactivation signal. For simplicity of illustration and discussion, the latter type of control output is assumed in the following discussion.

Methods for Identifying Unidentified Controlled Systems

Intelligent-controller users can register an intelligent controller by answering questions in a setup dialog presented on the intelligent-controller user interface or in a registration questionnaire that is used by a manufacturer, an organization, or vendor to provide support services, such as receiving important software and operating system updates, service information, advice to help the intelligent controller user more efficiently and better manage the intelligent controller, and control schedule changes so that the intelligent controller can more efficiently and effectively operate a controlled entity to better serve the user's habits and needs. The answers provided by the intelligent-controller user in a setup dialog or registration questionnaire are called registration data. Registration of an intelligent controller can take place by the user responding to a number of simple questions presented in a registration questionnaire. The answers can be responses to specific questions about the one or more entities to be controlled by the intelligent controller, such as the model numbers and years the entities were manufactured, and the address or zip code of the smart-home environment in which the intelligent controller is installed. Depending on the type of intelligent controller more specific information regarding the smart-home environment may be requested. For example, information regarding the type of home, such as whether or not the home is an apartment or a standalone dwelling, the home layout, such as the number of floors, bathrooms, and bedrooms, and the year the home was built are the kinds of information that when collected can be used by an organization or vender to adjust parameters the intelligent controller uses to efficiently and effectively operate a controlled entity. The user can register the intelligent controller by answering questions presented on the intelligent controller user interface when the intelligent controller is first turned on, or the user can register the intelligent controller using an organization or vendor website that presents the user with the questions via a user interface. Alternatively, the registration questions can be presented on a registration card that is provided with the intelligent controller and mailed to the organization or vendor.

Figure 11:
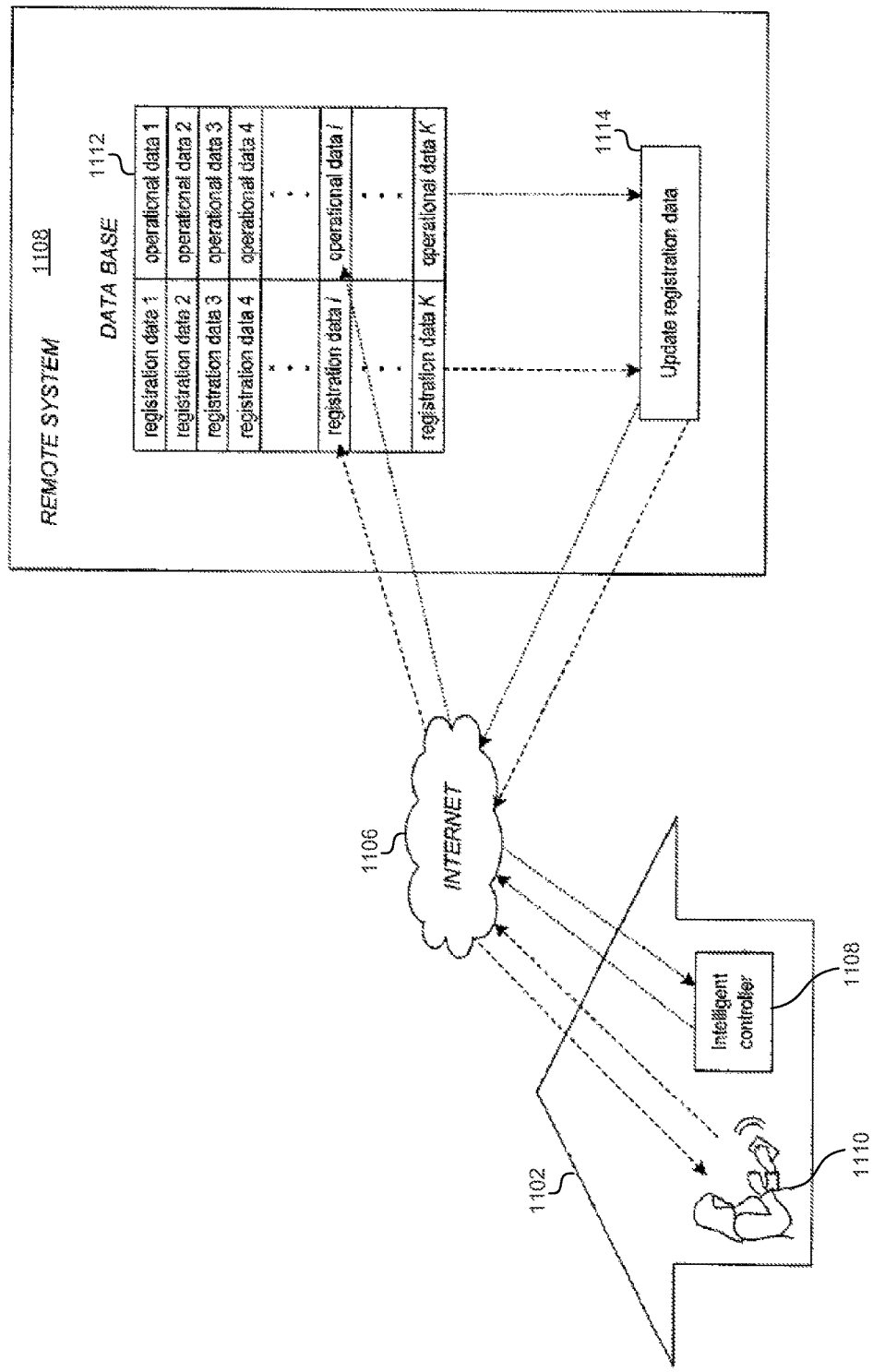
FIG. 11 illustrates a smart-home environment with an intelligent controller connected to the Internet, according to some embodiments.

FIG. 11 illustrates a smart-home environment 1102 with an intelligent controller 1104 connected to the Internet 1106. When the intelligent controller 1104 is installed and connected to the Internet 1106 for the first time, the intelligent controller 1104 contacts a remote system 1108 via the Internet 1106. The remote system 1104 can represent one or both of the entities 210 and 213 described above with reference to FIG. 2, or represent another cloud-based computer system that processes data provided by the intelligent controller 1104. The remote system 1108 receives the intelligent controller 1104 IP address, model number and serial number, which can be used to create an intelligent-controller account associated with the intelligent controller 1104. In the example of FIG. 11, an intelligent controller user 1110 also inputs registration data over the Internet 1106 that can be linked to the account via the intelligent controller serial number. The remote system 1104 includes one or more data storage devices that are used to store a data base 1112 of registration data and corresponding operational data collected for each of K intelligent controllers connected to the Internet 1106. Operational data is the data collected by one or more intelligent-controller sensors, a control specification and control schedules input to intelligent controller by the user 1110, and any other data generated by the intelligent controller in response to the data collected by the one or more sensors, control specification and control schedules. Registration data may be input one time, but operational data can be collected and processed at regular intervals of time, such as hourly, daily, or weekly, and sent to the remote system 1108 for storage and processing. The remote system 1108 can then process the operational data for each intelligent-controller user to confirm that the registration data is consistent with the operational data based on operational data and registration data collected from other users of the same intelligent controller.

Figure 12:
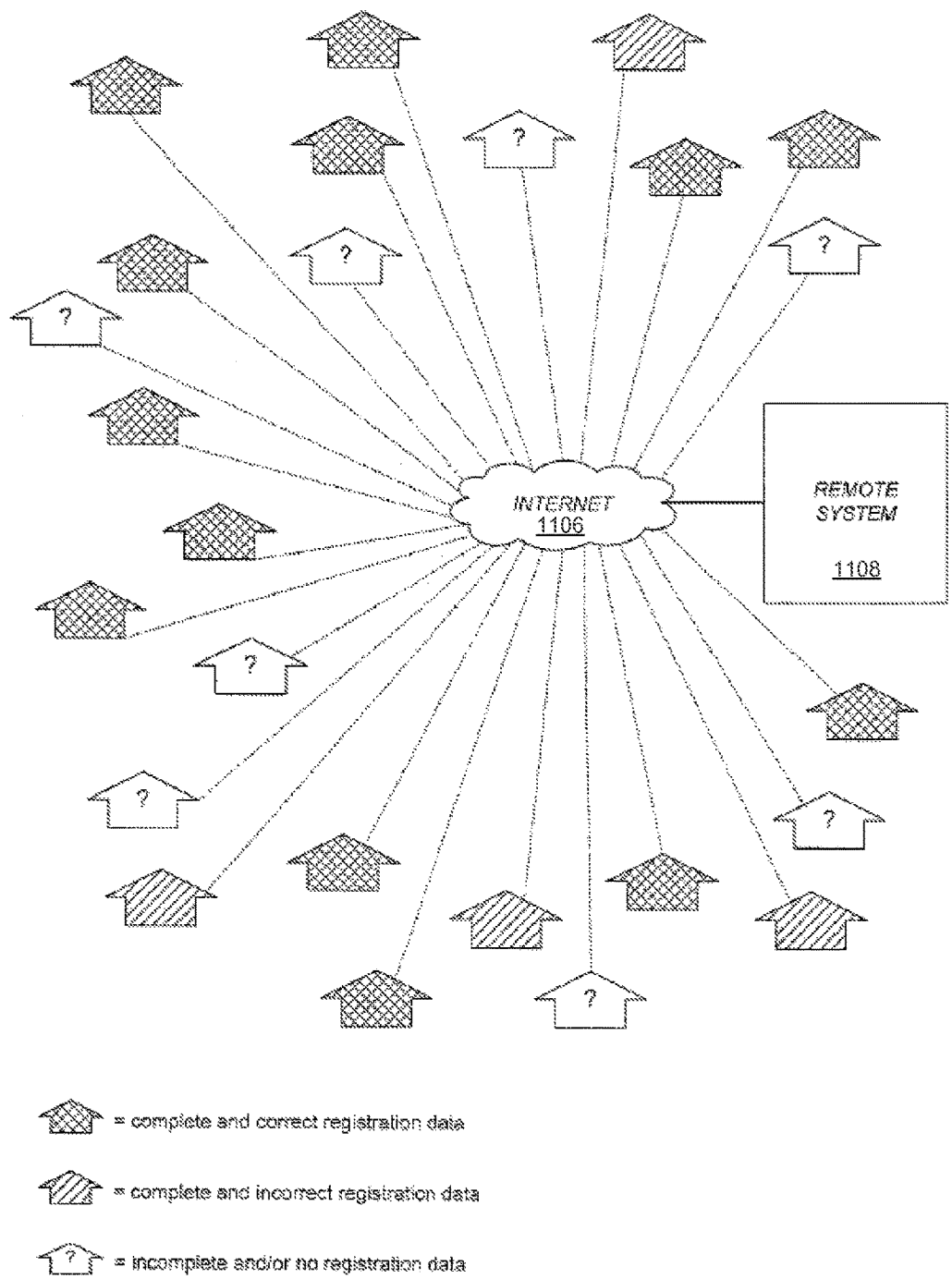
FIG. 12 illustrates a number of smart-home environments with similar intelligent controllers connected to a remote system, according to some embodiments.

Although many intelligent controller users who choose to connect their intelligent controller to the Internet provide full and accurate information to questions in a registration questionnaire, a number of intelligent-controller users may mistakenly submit inaccurate answers to questions or fail to answer all or a number of the questions in a registration questionnaire or setup dialog. For example, most intelligent-controller users who answer questions in a registration questionnaire may be more likely to provide accurate home address, home type, and home layout information, but may provide an inaccurate controlled entity model number, or the user may be distracted after installation of the intelligent controller and forget to complete all or most of a registration questionnaire. FIG. 12 illustrates a number of smart-home environments with similar intelligent controllers connected to the remote system 1108 via the Internet 1106, as described above with reference to FIG. 2. The phrase "similar intelligent controllers" refers to intelligent controllers that have common features, operation, and produce the same kind of operational data. For example, intelligent thermostats are an example of similar intelligent controllers, intelligent hazard-detection units are also an example of similar intelligent controllers, and smart switches are another example of similar intelligent controllers. Different shading is used to identify the amount and accuracy of the registration data each user provided in response to a registration question used to register each intelligent controller. Cross-hatching represents smart homes in which complete and correct registration data has been provided in response to a registration questionnaire about the intelligent controller, the one or more controlled entities, and the smart-home environment. Hash-marking represents smart homes in which a user has completed the registration questionnaire, but certain registration data regarding the intelligent controller, one or more controlled entities, or the smart-home environment is incorrect. Question marks represent smart homes in which a user failed to complete a registration questionnaire resulting in incomplete or no registration data collected.

Returning to FIG. 11, the registration data and corresponding operational data for each intelligent controller is computationally processed 1114 to determine if the registration data is complete and consistent with the registration data of other similar intelligent controller users. If the registration data is consistent with that of similar intelligent-controller users, the operational data can be further processed to determine appropriate adjustments to the control schedule that are sent to the intelligent controller 1104 to provide more efficient and effective use of the controlled entities. If the registration data is not consistent with the registration data of other similar intelligent controller users, computational methods described below can be used to determine potentially incorrect registration data and prompt the user to verify or provide more accurate registration data via the intelligent controller user interface or e-mail. If the registration data is incomplete computational methods described below can be used to generate missing registration data.

Computational methods and systems directed to correcting or filling in missing registration data based on operational data are now described. The registration data associated with an intelligent controller can be represented mathematically using column vector notation as follows:

$$\check{R} = \begin{bmatrix} r_1 \\ r_2 \\ r_3 \\ M \\ r_N \end{bmatrix} \quad (1)$$

where $r_i$ represents the ith registration data element, and N represents the number of registration data elements.

A registration data element $r_i$ is a numerical value that represents an answer to a question in a setup dialog or registration questionnaire. For example, the element $r_1$ can be a numerical value that represents the zip code, state, city, or any other piece of address information associated with where the intelligent controller is located. The element $r_2$ can be a numerical value that represents the type of home, such as an apartment or a standalone dwelling. The element $r_3$ can be a numerical value that represents the model of a controlled entity.

On the other hand, the operational data collected and/or generated by the intelligent controller can also be represented mathematically using column vector notation as follows:

$$\check{Q} = \begin{bmatrix} q_1 \\ q_2 \\ q_3 \\ M \\ q_M \end{bmatrix} \quad (2)$$

where $q_j$ represents the jth operational data element, and M represents the number of operational data elements.

An operational data element $q_j$ is a numerical value that represents a particular type of information collected by sensors and/or generated by the intelligent controller in response to the information collected by the one or more sensors, control specification and control schedules. For example, the element $q_1$ can be a numerical value that represents a setpoint when a controlled entity is to be turned on or off. The element $q_2$ can represent a parameter measured by a sensor.

Registration data $\check{R}$ can be mathematically related to operational data $\check{Q}$ by a function that maps the operational data to the registration data as follows:

$$\check{R} = H[\check{Q}] \quad (3)$$

where H represents a function that relates the operational data to each element of the registration data.

The function H may also have an inverse $H^{-1}$ that maps the registration data to the operational data as follows:

$$\check{Q} = H^{-1}[\check{R}] \quad (4)$$

In certain embodiments, the function H can be computed using neural network-based techniques can be used to produce a mathematical model of the relationship between known operational data and registration data. Neural networks are a computational modeling technique that changes structure during a learning phase and can be used to model the complex relationship between the registration data $\check{R}$ and the operational data $\check{Q}$. Learning is achieved by adjusting numerical weights in a network until the network-action computing performance is acceptable. FIG. 13A illustrates a graph of an example neural network 1300 for determining a relationship between the registration data $\check{R}$ and the operational data $\check{Q}$. The neural network 1300 includes an input layer 1302, two hidden layers 1304 and 1306, and an output layer 1308. The input layer 1302 is composed of nodes that correspond to the operational data elements of $\check{Q}$, and the output layer 1308 is composed of nodes that correspond to the registration data elements of $\check{R}$. Hidden layers 1304 and 1306 are composed of nodes that represent hidden units denoted by $a_j$. Hidden layer 1304 is composed of F nodes that correspond to F hidden units, and hidden layer 1306 is composed of G nodes correspond to G hidden units. Certain pairs of nodes are connected by links or edges, such as link 1310, that represent weights denoted by $W'_{ji}$. Each weight determines the strength and sign of a connection between two nodes. It should be noted that neural networks are not limited to two hidden layers and a fixed number of nodes in each layer. The number of hidden layers and number of nodes in each hidden layer can be selected based on computation efficiency. In other words, the number of hidden layers can range from a few as one to some number greater than two, and the number of nodes in each hidden layer is not limited.

FIG. 13B presents an example of a pseudocode for multilayer feed-forward neural networks that execute learning through back propagation. The number of layers in the neural network is denoted by a positive integer L. It should be noted that this pseudocode is not intended to limit the number of steps or to be exhaustive of the numerous ways in which a multilayer feed-forward neural network can be implemented to compute a relationship between operational data and registration data, but is instead provided as one example of a computation approach to computing the relationship between operational data and registration data.

In step 1, the weights $W'_{ji}$ are initialized to values between 0 and 1. The weights can be initialized using a random number generator that assigns a randomly computed value between 0 and 1 to each of the weights. The initialization is performed one time and the weights are computed for a number of corresponding operational and registration data associated with a type of intelligent controller. For example, returning to FIG. 11, the database 1112 is composed of K corresponding operational and registration data sets. In step 2, steps 3 through 10 are repeated to calculate or train a set of weights that defines a relationship between the K sets of operational and registration data stored in the database 1112.

In step 3, the registration data and operational data are retrieved from the database. Each operational data element is a node in the input layer, and each registration data element is a node in the output layer. In the for-loop of step 4, each node or operational data element $q_j$ in the input layer is assigned to a hidden unit $a_j$. In the for-loop of step 5, for each layer 1 between 2 and L, $h(sum_i)$ is calculated and assigned to a hidden unit $a_i$ for each node, where h is an activation function. The activation function, h, can a threshold activation function that outputs 1 when the input is positive and 0 otherwise. Alternatively, the activation function can be a sigmoid function. Examples of sigmoid activation functions include $h(sum_i) = \tan h(sum_i)$ and $h(sum_i) = 1/(1+e^{-sum_i})$. In the for-loop of step 6, for each node in the output layer an error $Error_i$ and a modified error $\Delta_i$ are calculated, where h' represents the first derivative of the activation function h. The modified error corresponds to a fraction of the error in the nodes of the output layer. Step 7 is a for-loop that executes back propagation and weight updates in steps 8 and 9 beginning with L−1 and ending with the input layer (i.e., l=1). In the for-loop of step 8, the modified error is calculated for each hidden layer l, and in the for-loop of step 9, the weights are updated for each node in the hidden layer l+1. In step 10, when the $Error_i$ for each node in the output layer is less than a defined error threshold, steps 3 through 10 are repeated for another set of registration data and operational data. Otherwise, if one of the errors $Error_i$ exceeds or equals the predefined threshold, steps 5 through 10 are repeated. Note that in other embodiments rather than using a threshold, steps 5 through 9 can be repeated for a preset number of iterations.

Figure 14:
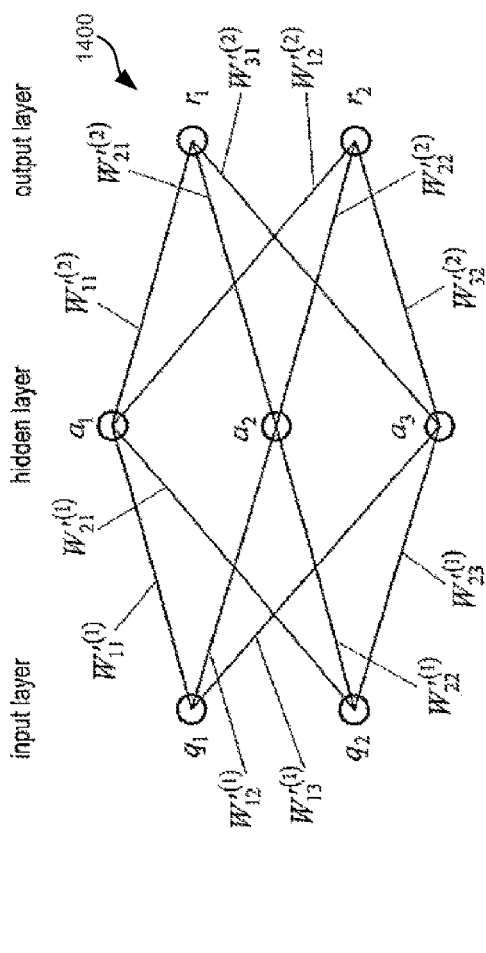
FIG. 14 shows a simple example of a feed-forward neural network, according to some embodiments.

Steps 3 through 10 can be repeated for a large number of test participants in order to computationally generate a set of weights that define a relationship between operational and registration data associated with a particular type of intelligent controller. The set of weights can then be used to check the accuracy of registration data for other intelligent controller users, or determine unknown registration data for intelligent-controller users who failed to complete a registration survey. FIG. 14 shows a simple example of a feed-forward neural network 1400 with an operational data set composed of two operational data elements $q_1$ and $q_2$ and a registration data set also composed of two registration data elements $r_1$ and $r_2$. In this example only one hidden layer composed of three hidden units $a_1$, $a_2$, and $a_3$ is selected to determine a set of weights. In FIG. 14, a first set of weights that link the operational data elements $q_1$ and $q_2$ to the hidden units $a_1$, $a_2$, and $a_3$ are denoted by $W'^{(1)}_{11}$, $W'^{(1)}_{21}$, $W'^{(1)}_{12}$, $W'^{(1)}_{13}$, $W'^{(1)}_{22}$, and, $W'^{(1)}_{23}$, and a second set of weights that link the hidden units $a_1$, $a_2$, and $a_3$ to the registration data elements $r_1$ and $r_2$ are denoted by $W'^{(2)}_{11}$, $W'^{(2)}_{21}$, $W'^{(2)}_{31}$, $W'^{(2)}_{12}$, $W'^{(2)}_{22}$, and, $W'^{(2)}_{32}$. The weights can be calculated using a feed-forward neural network, such as the pseudocode described above with reference to FIG. 13B, for a large number of test participants that use the same intelligent controller and provided full and correct registration data. Now consider, for example, an intelligent-controller user who uses the same intelligent controller but failed to provide the registration data element $r_1$. An approximate value for $r_1$ can be calculated by first calculating the hidden units as a function of the operational data and the first set of weights, as represented by a first set of equations 1402. Next, the approximate value for $r_1$ is calculated as a function of the hidden units calculated in equations 1402 and the second set of weights as represented by equation 1404. FIG. 14 includes equation 1406 that combines equations 1402 and 1404 into a single equation that can be used to calculate the approximate value for $r_1$ as a function of the operational data and the two sets of weights.

The simple example in FIG. 14 demonstrates how an unknown registration data element can be calculated from operational data and a trained set of weights. In practice, a feed-forward neural network with backward propagation can be used to calculate operational data from known registration data by identifying the registration data as the input layer and the operational data as the output layer and following the same computational method described above with reference to FIG. 13B. In other words, a feed-forward neural network with backward propagation can be used to calculate unknown operational data or check operational data using a set of weights that mathematically relate registration data as the input layer to operational data as the output layer.

The function H defined in Equation (3) can be a series of N functions with each function mapping the operational data $\check{Q}$ to one registration data element of $\check{R}$:

$$\check{R} = H[\check{Q}] = \begin{bmatrix} r_1(\check{Q}) \\ r_2(\check{Q}) \\ r_3(\check{Q}) \\ M \\ r_N(\check{Q}) \end{bmatrix} \quad (5)$$

In Equation (5), each registration data element is calculated as a function of the operational data. The inverse function $H^{-1}$ can also be a series of M functions with each function mapping the registration data to one registration data element of $\check{Q}$:

$$\check{Q} = H^{-1}[\check{R}] = \begin{bmatrix} q_1(\check{R}) \\ q_2(\check{R}) \\ q_3(\check{R}) \\ M \\ q_M(\check{R}) \end{bmatrix} \quad (6)$$

In Equation (6), each operational data element is calculated as a function of the registration data.

In certain embodiments, the function H can represent a matrix given by:

$$\check{R} = H[\check{Q}]W\check{Q} \quad (7)$$

where $$W = \begin{bmatrix} W_{11} & W_{12} & W_{13} & L & W_{1M} \\ W_{21} & W_{22} & W_{23} & & \\ W_{31} & W_{32} & W_{33} & & M \\ M & & & O & \\ W_{N1} & & L & & W_{NM} \end{bmatrix} \quad (8)$$

and with the $W_{ij}$'s are real-valued weights.

In other words, each registration data element given in Equation (5) can be a linear function of the operational data as follows:

$$r_i(\check{Q}) = \sum_{j=1}^{M} W_{ij} q_j \quad (9)$$

Likewise, the inverse function $H^{-1}$ can represent a matrix given by:

$$\check{R} = H^{-1}[\check{Q}]w\check{Q} \quad (10)$$

where $$w = \begin{bmatrix} w_{11} & w_{12} & w_{13} & L & w_{1N} \\ w_{21} & w_{22} & w_{23} & & \\ w_{31} & w_{32} & w_{33} & & M \\ M & & & O & \\ w_{M1} & & L & & w_{MN} \end{bmatrix} \quad (11)$$

and the $w_{ji}$'s are real-valued weights.

In other words, each operational data element given in Equation (6) can be a linear function of the registration data as follows:

$$q_j(\check{R}) = \sum_{i=1}^{N} w_{ji} r_i \quad (12)$$

The weights $W_{ij}$'s and $w_{ji}$'s in Equations (9) and (12), respectively, can be determined empirically by adjusting the weights using registration data and operational data obtained from a number of various, closely monitored test participants. In other embodiments, the weights $W_{ij}$'s in Equation (9) can be determined empirically and the weights $w_{ji}$'s in matrix Equation (11) can be calculated by computing a pseudoinverse of the matrix Equation (8). In other embodiments, the weights $w_{ji}$'s in Equation (11) can be determined empirically and the weights $W_{ji}$'s in matrix Equation (9) can be calculated by computing a pseudoinverse of the matrix Equation (11).

In other embodiments, more complex polynomial functions can be formulated to characterize the relationships between the registration data and the operational data. In other words, each registration data element given in Equation (5) can be a polynomial function of the operational data:

$$r_i(\check{Q}) = \sum_{j=1}^{M} B_{ij} q_j^{A_{ij}} C_i \qquad (13)$$

where $A_{ij}$, $B_{ij}$, and $C_i$ are real-valued constants.

In addition, each operational data element given in Equation (6) can be a polynomial function of the registration data:

$$q_j(\check{R}) = \sum_{i=1}^{N} b_{ji} r_j^{a_{ji}} c_j \qquad (14)$$

where $a_{ji}$, $b_{ji}$, and $c_j$ are real-valued constants.

The constants $A_{ij}$, $B_{ij}$, and $C_i$ in Equation (13) and the constants $a_{ji}$, $b_{ji}$, and $c_j$ in Equation (14) can be determined empirically by adjusting the constants so that registration data and operational data obtained from a large number of test participants satisfy Equations (5) and (6).

In other embodiments, rational functions can be formulated to characterize the relationships between the registration data and the operational data. For example, each registration data element given in Equation (5) can be calculated using a rational polynomial function of the operational data:

$$r_i(\check{Q}) = \frac{\sum_{j=1}^{M} B_{ij} q_j^{A_{ij}} + C_i}{\sum_{j=1}^{M} D_{ij} q_j^{E_{ij}} + J_i} \qquad (15)$$

where $A_{ij}$, $B_{ij}$, $C_i$, $D_{ij}$, $E_{ij}$, and $J_i$ are real-valued constants.

In addition, each operational data element given in Equation (6) can be calculated using a rational polynomial function of the registration data:

$$q_j(\check{S}) = \frac{\sum_{i=1}^{N} b_{ji} r_i^{a_{ji}} + c_j}{\sum_{i=1}^{N} e_{ji} r_i^{f_{ji}} + g_j} \qquad (16)$$

where $a_{ji}$, $b_{ji}$, $c_j$, $e_{ji}$, $f_{ji}$, and $g_j$ are real-valued constants.

The constants in Equations (15) and (16) can be determined empirically by adjusting the constants so that registration data and operational data obtained from a large number of test participants satisfy Equations (5) and (6).

Methods for calculating operational data or registration data are not intended to be limited the methods described above. By way of further example, operational data or registration data may be calculated using machine learning and other mathematical optimization algorithms carried out using one or more known technologies, models, and/or mathematical strategies including, but not limited to, artificial neural networks, Bayesian networks, genetic programming, inductive logic programming, support vector machines, decision tree learning, clustering analysis, dynamic programming, stochastic optimization, linear regression, quadratic regression, binomial regression, logistic regression, simulated annealing, and other learning, forecasting, and optimization techniques.

Next, FIGS. 15A-15D illustrate an example implementation of a method that incorporates the above described mathematical models for updating registration data. At the onset, it should be noted that the following implementation is but one of many different possible implementations that can be obtained by varying many different design and implementation parameters, including modular organization, control structures, data structures, programming language, hardware components, firmware, and other such design and implementation parameters.

Figure 15A:
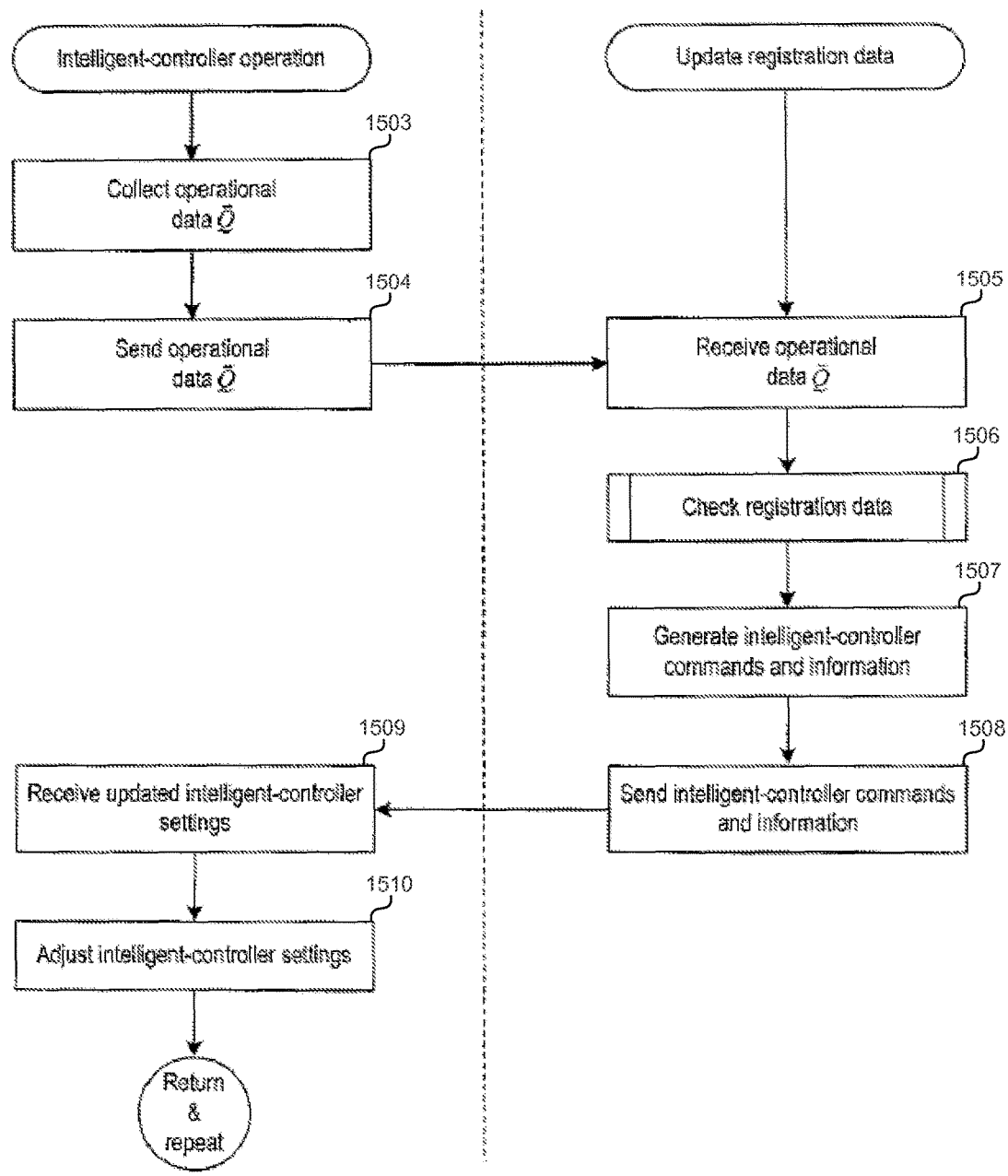
FIGS. 15A-15D illustrate an example implementation of a method that incorporates the above described mathematical models for updating registration data, according to some embodiments.

FIG. 15A shows a high-level interaction between an intelligent controller and remote system. Left-hand column 1501 represents steps executed by an intelligent controller interacting with a remote system, and right-hand column 1502 represents steps carried out by the remote system in response to operational data received from the intelligent controller. In step 1503, the intelligent controller collects operational data. The operational data can include data collected from various sensors, control schedules, user entered control schedule changes and any automatically generated control schedule changes initiated by the intelligent controller. The operational data may also include any additional data generated by the intelligent controller. In step 1504, the intelligent controller transmits the operational data to the remote system. The intelligent controller can transmit the operational data hour, daily, weekly, or monthly, or at other regular or irregular time intervals. Different portions of the operation data can be sent to the remote system at different times. For example, data collected by the intelligent-controller sensors can be sent hour, daily or weekly, while data generated by the intelligent-controller in response to certain data collected by the sensors can be accumulated and processed over a period of time and then sent to the remote system on a weekly basis. In step 1505, the remote system receives and stores the operational data. In step 1506, a routine "check registration data" is called to determine whether or not there may be inaccuracies in the registration data or whether the registration data is complete. The routine check registration data also attempts to fill in any unknown registration data and attempts to correct registration data inaccuracies based on the received operational data and the mathematical models that relate the operational data to the registration data, such as the mathematical models described above.

In step 1507, a complete set of operational and registration data can be used to generated commands and information that improve performance of the intelligent controller. For example, the operational and registration data can be used to (1) generate instructions and/or upgrades from one or more intelligent controller data service providers or other sources; (2) collect current and forecasted information for inclusion in control algorithm processing that lower the cost of operating a controlled entity; (3) generate user control commands from the user's computer, network-connected television, smart phone, and/or other stationary or portable data communication appliance; (4) receive control commands and information from a management advisor, such as a subscription-based service aimed at leveraging collected information from multiple sources to generate control commands and/or profiles for their subscribers; and (5) generate control commands and information from a management authority, such as a utility company to which limited authority has been voluntarily given to control the intelligent controller in exchange for rebates or other cost incentives.

In step 1508, the updated intelligent-controller control commands and information are transmitted to the intelligent controller. In step 1509, the updated intelligent-controller settings are received by the intelligent controller. In step 1510, appropriate intelligent-controller setting can be adjusted. The steps 1503-1510 can be repeated for the same type of intelligent controllers that are connected to the remote system. For example, if the intelligent controllers are intelligent thermostats, then all or nearly all of the intelligent thermostats that are connected to the internet can engage in the same interaction with a remote system configured to process operational data provided by the intelligent thermostats to the remote system.

Figure 15B:
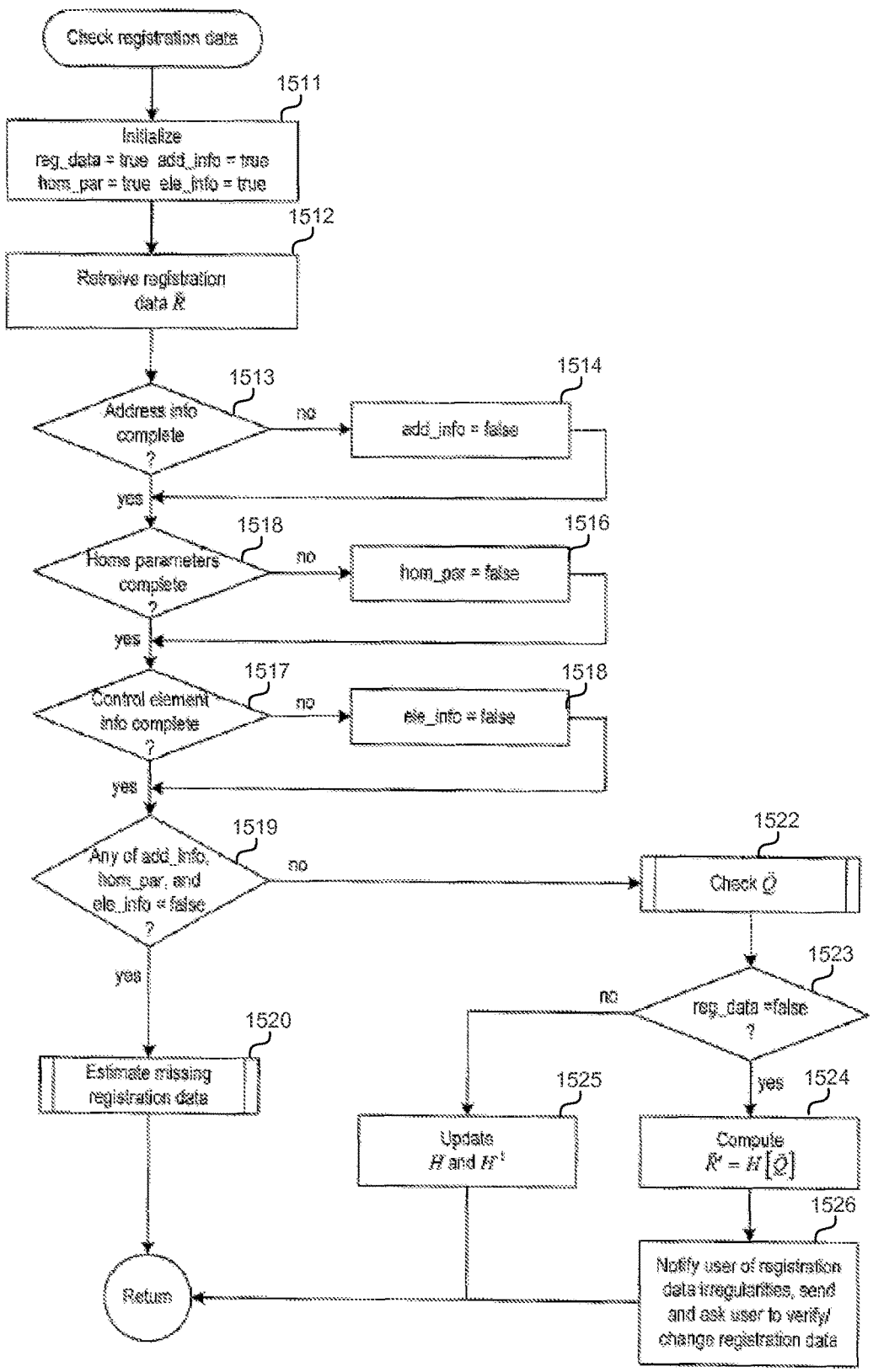

FIG. 15B illustrates a control-flow diagram for the routine "check registration data" called in step 1507 in FIG. 15A. In step 1511, certain logical parameters registration data that represents aspects of the registration data are initialized as true. For example, "reg_data" represents the accuracy of the registration data is assigned the logic value "true," "add_info" represents the accuracy of the address information is assigned the logic value "true," "hom_par" represents the accuracy of the home parameters, such as home layout, year, type, etc., is assigned the logic value "true," and "ele_info" represents the accuracy of the controlled entity information is assigned the value "true." In step 1512, after receiving the operational data, the remote system uses the IP address, intelligent-controller serial number or any account information that is sent along with the operational data to the remote system to retrieve from storage any known registration data associated with the intelligent controller. The registration data can be complete and accurate, complete but may include certain inaccuracies, or the registration data may be incomplete. In step 1513, the address information in the registration data is assessed for completeness. When the address information is determined to be incomplete, control flows to step 1514 where "add_info" is assigned the value "false." In step 1515, the home parameters in the registration data are assessed for completeness. When the home parameters are determined to be incomplete, control flows to step 1516 and "home_par" is assigned the value "false." In step 1517, the controlled element information is assessed for completeness. When the controlled element information is determined to be incomplete, control flows to step 1518 where "ele_info" is assigned the value "false." In step 1519, when any one or more of "add_info," "hom_par," and "ele_info" is false, control flows step 1520. In step 1520, the routine "estimating missing registration data" is called to compute certain of the incomplete registration data. In step 1519, when "add_info," "hom_par," and "ele_info" are all "true," control flows to steps 1522-1526 to determine whether or not the registration data contains any inconsistencies of inaccuracies. In step 1522, the routine "check $\vec{Q}$" is called to determine if the operational data provided by the intelligent controller is consistent with the registration data. The routine "check $\vec{Q}$" returns "reg_data" as either true or false. In step 1523, when the routine "check $\vec{Q}$" returns "reg_data" as "false," $\vec{Q}$ is not consistent with the corresponding registration data, which indicates there may be inaccuracies in the registration data, and control flows to step 1524. Otherwise, control flows to step 1525. In step 1524, approximate registration data $\vec{R}'$ is calculated using the operational data. The approximate registration data can be calculated using Equations (9) and (13) or using weights obtain from a feed-forward neural network as described above with reference to FIGS. 13-14. In step 1526, the intelligent-controller user is notified either at the intelligent controller user interface or via e-mail that the registration data is not consistent with the operation data. The user may be asked to verify their registration data and may be sent the approximate registration data so that the user can examine the approximate registration data and confirm or change any inaccurate registration data. In step 1525, because the intelligent-controller user has produced registration data that is consistent with the operational data, the constants and weights used to calculate H and $H^{-1}$ can be updated with the information from the user. For example, the user's operational and registration data can be included in the test operational and registration data used to compute weights obtained from a feed forward neural network computation. Alternatively, the user's operational and registration data can be included in the empirical determination of the constants in Equations (9), (12), (13), and (14).

Figure 15C:
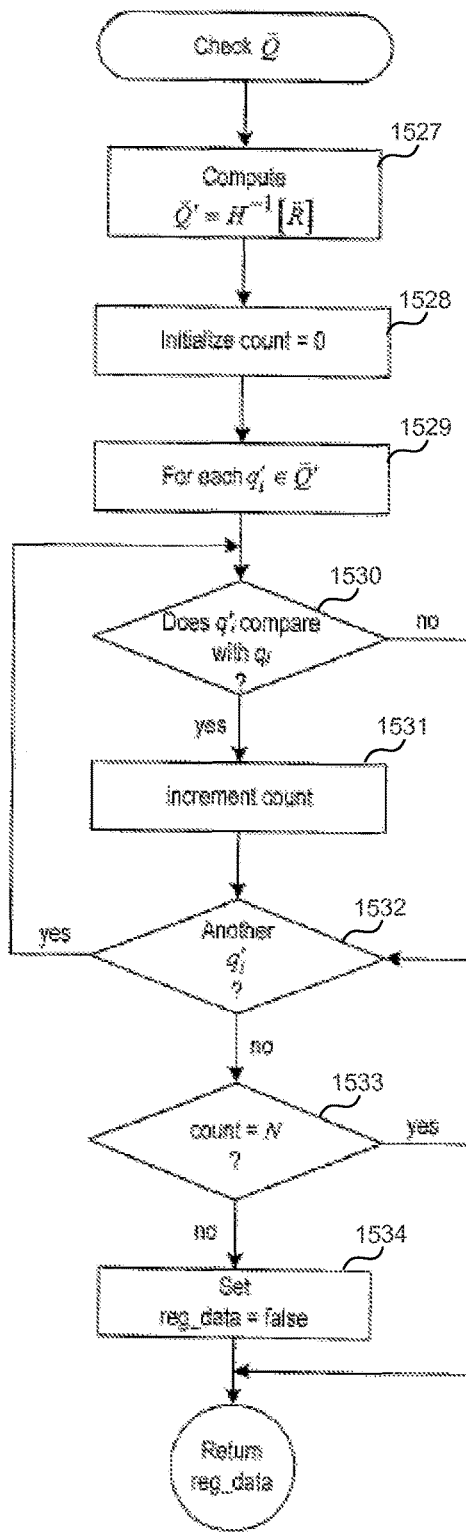

FIG. 15C illustrates a flow-control diagram of the routine "check $\vec{Q}$" called in step 1522 in FIG. 15B. In step 1527, approximate operational data, $\vec{Q}'$, is computed based on the complete set of registration data. The approximate operational data can be computed using Equations (12) or (14). As described above, the constants for Equations (12) and (14) can be empirically determined from a set of similar intelligent controllers and controlled devices. Alternatively, the approximate operational data can be computed from weights obtained from a neural network based technique, as described above with reference to FIGS. 13-14. In step 1528, an index "count" is initialized to "0." In the for-loop beginning in step 1529, steps 1530-1534 are repeated. In step 1530, the approximate operational data elements $q'_i$ of the approximate registration data $\vec{Q}'$ computed in step 1527 are compared with the operational data elements $q_i$ of the approximate registration $\vec{Q}$. For example, tolerances denoted by $T_i$ can be used to determine whether approximate operational data elements are comparable to operational data elements. For example, when $|q'_i - q_i| < T_i$, control flows from step 1530 to step 1531 in which the index "count" is incremented, otherwise when $|q'_i - q_i| \geq T_i$, control flows to step 1532 and incrementing "count" in step 1531 is skipped. In step 1532, if more approximate operational data elements are available step 1530 is repeated, otherwise control flows to step 1533. In step 1533, when "count" does not equal N, which is the number of operational data elements, control flows to step 1534 and reg_data is assigned "false" and control flows back to the routine "check registration data in FIG. 15B. Otherwise, "reg_data" remains "true" and control flows back to the routine "check registration data" in FIG. 15B.

Figure 15D:
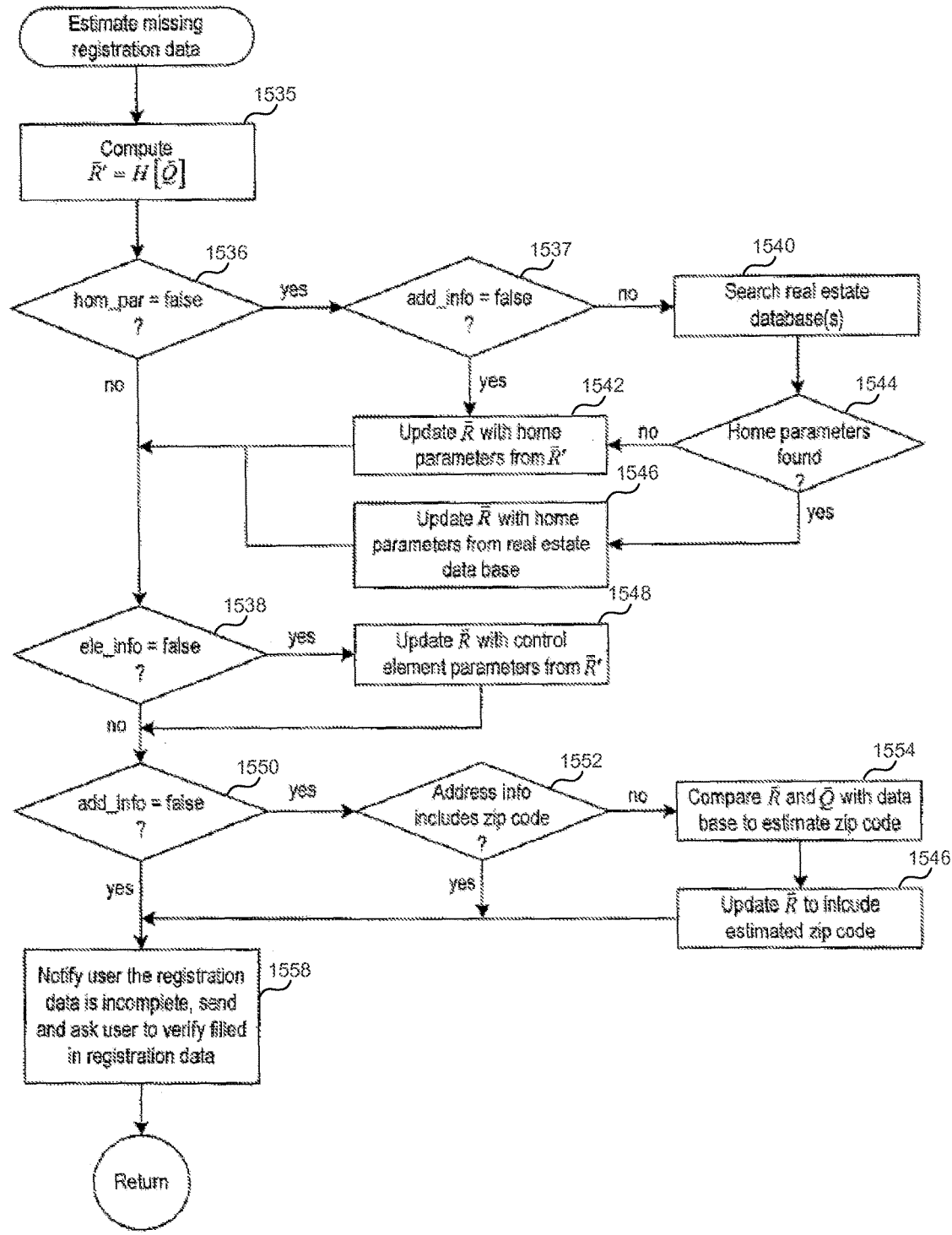

FIG. 15D illustrates a flow control diagram of the routine "estimating missing registration data" called in step 1520 in FIG. 15B. In step 1535, approximate registration data $\vec{R}'$ is calculated from the operational data using Equations (9) or Equations (13) or using weights obtain from a feed-forward neural network as described above with reference to FIGS. 13-14. In step 1536, when "hom_par" is "false" certain home parameters, such as home layout, square footage, and home type are unknown, so control flows to step 1537, otherwise control flows to step 1538. In step 1537, when "add_info" is also "false" the home address information may be incomplete or unknown so control flows to step 1542, otherwise control flows to step 1540. In step 1540, the known address information is used to search one or more real estate databases for certain unknown parameters, such as the square footage, year the home was built, home layout, and home type. The real estate data bases may not have information on every home that supplies operational data. As a result, in step 1544, when certain home parameters cannot be obtained from the one or more real estate databases, control flows to step 1542, otherwise when the home parameters can be obtained from the one or more real estate databases, control flows to step 1546. In step 1542, missing home parameter registration data is filled in with corresponding home parameter registration data in the approximate registration data computed in step 1535. In step 1546, missing home parameter registration data is filled in with the information obtained from the real estate database. In step 1538, when ele_info is false, registration data associated with the model of the controlled entity is unknown and control flows to step 1548, otherwise control flows to step 1550. In step 1548, missing controlled entity information is filled in with corresponding controlled entity data in the approximate registration data computed in step 1535. In step 1550, when add_info is false, the address information provided by the intelligent-controller user is incomplete or may be entirely unknown. Therefore, in order to obtain at a minimum some regional information with respect to where the intelligent controller is located control flows to steps 1552-1556. In step 1552, the address information is checked to determine if a zip code is included in the registration data. When a zip code is not included, control flows to step 1554, otherwise control flows to step 1558. In step 1554, known registration and operational data are compared with registration and operation data of other intelligent-controller users. In step 1556, the registration and operational data is updated with an estimated zip code that corresponds to an intelligent controller user with registration and operational data that is highly correlated to the intelligent controller user. In step 1558, the intelligent-controller user is notified either at the intelligent controller user interface or via e-mail that the registration data is incomplete. The user may be presented with a notice that the registration data is incomplete and may be sent the approximate registration data so that the user can confirm or change any inaccurate registration data.

An Intelligent Thermostat as an Example of an Intelligent Controller

In the following description, an intelligent thermostat is described as just one example of an intelligent controller that can be used with the above describes methods. The intelligent thermostat described below is equipped with a selectively layered functionality that exposes unsophisticated users to a simple user interface, but provides advanced users with an ability to access and manipulate many different energy-saving and energy tracking capabilities. Even for the case of unsophisticated users who are only exposed to the simple user interface, the intelligent thermostat provides advanced energy-saving functionality that runs in the background. The intelligent thermostat uses multi-sensor technology to learn the heating and cooling environment in which the intelligent thermostat is located and to optimize energy-saving settings.

The intelligent thermostat collects operation data and also learns about the users, beginning with a setup dialog in which the user answers a few simple questions, and then continuing, over time, using multi-sensor technology to detect user occupancy patterns and to track the way the user controls the temperature using schedule changes and immediate-control inputs. For example, the intelligent thermostat can collect operational data in increments of time, such as 30 second intervals, 15 minute intervals, and 1 hour intervals.

On an ongoing basis, the intelligent thermostat processes the learned and sensed information, automatically adjusting environmental control settings to optimize energy usage while, at the same time, maintaining the temperature within the environment at desirable levels, according to the learned occupancy patterns and comfort preferences of one or more users. Advantageously, the selectively layered functionality of the intelligent thermostat allows for effective operation in a variety of different technological circumstances within home and business environments. For simple environments having no wireless home network or Internet connectivity, the intelligent thermostat operates effectively in a standalone mode, learning and adapting to an environment based on multi-sensor technology and user input. However, for environments that have home network or Internet connectivity, the intelligent thermostat operates effectively in a network-connected mode to offer additional capabilities.

When the intelligent thermostat is connected to the Internet via a home network, such as through IEEE 802.11 (Wi-Fi) connectivity, the intelligent thermostat may: (1) provide real-time or aggregated home energy performance data to a utility company, intelligent thermostat data service provider, intelligent thermostats in other homes, or other data destinations; (2) receive real-time or aggregated home energy performance data from a utility company, intelligent thermostat data service provider, intelligent thermostats in other homes, or other data sources; (3) receive new energy control instructions and/or other upgrades from one or more intelligent thermostat data service providers or other sources; (4) receive current and forecasted weather information for inclusion in energy-saving control algorithm processing; (5) receive user control commands from the user's computer, network-connected television, smart phone, and/or other stationary or portable data communication appliance; (6) provide an interactive user interface to a user through a digital appliance; (7) receive control commands and information from an external energy management advisor, such as a subscription-based service aimed at leveraging collected information from multiple sources to generate energy-saving control commands and/or profiles for their subscribers; (8) receive control commands and information from an external energy management authority, such as a utility company to which limited authority has been voluntarily given to control the intelligent thermostat in exchange for rebates or other cost incentives; (9) provide alarms, alerts, or other information to a user on a digital appliance based on intelligent thermostat-sensed HVAC-related events; (10) provide alarms, alerts, or other information to the user on a digital appliance based on intelligent thermostat-sensed non-HVAC related events; and (11) provide a variety of other useful functions enabled by network connectivity.

The subject matter of the instant disclosure is related to the subject matter of the following commonly assigned applications, each of which is incorporated by reference herein: U.S. Ser. No. 13/034,674 filed Feb. 24, 2011 ; U.S. Ser. No. 13/034,678 filed Feb. 24, 2011 ; U.S. Ser. No. 13/269,501 filed Oct. 7, 2011 ; U.S. Ser. No. 13/632,093 filed Sep. 30, 2012 ; U.S. Ser. No. 13/632,028 filed Sep. 30, 2012 ; U.S. Ser. No. 13/275,307 filed Oct. 17, 2011 ; U.S. Ser. No. 13/632,041 filed Sep. 30, 2012 ; U.S. Ser. No. 13/467,025 filed May 8, 2012 ; U.S. Ser. No. 13/988,435 filed Jan. 3, 2012 ; PCT Application Ser. No. PCT/US12/00007 filed Jan. 3, 2012 ; U.S. Ser. No. 13/866,578 filed Apr. 19, 2013 ; U.S. Ser. No. 13/632,070 filed Sep. 30, 2012 ;

U.S. Ser. No. 13/624,878 filed Sep. 21, 2012 ; U.S. Ser. No. 13/842,213 filed Mar. 15, 2013 ; and U.S. Ser. No. 13/866, 199 filed Apr. 19, 2013 .

Figure 16:
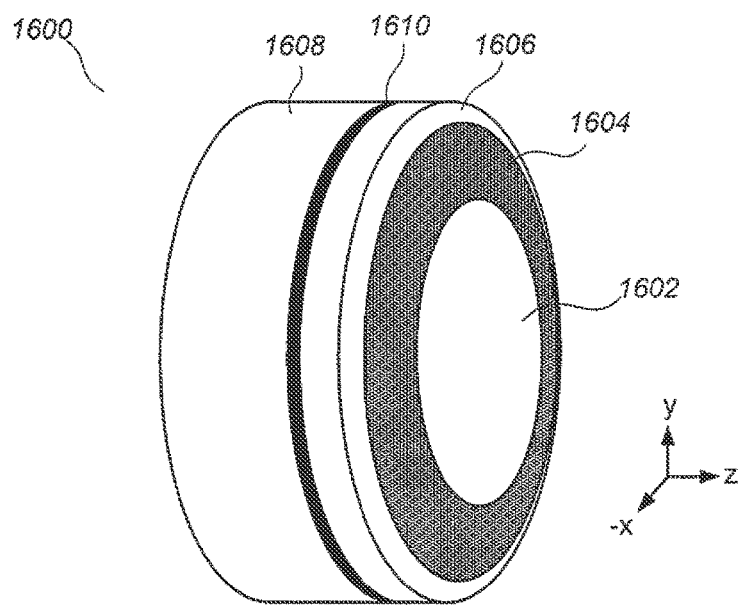
FIG. 16 illustrates a perspective view of an intelligent thermostat, according to some embodiments.

FIG. 16 illustrates a perspective view of an intelligent thermostat found to be particularly advantageous for use in conjunction with one or more of the described embodiments. The intelligent thermostat 1600 has a sleek, elegant appearance. The intelligent thermostat 1600 comprises a circular main body 1608 with a diameter of about 8 cm and that has a visually pleasing outer finish, such as a satin nickel or chrome finish. A cap-like structure comprising a rotatable outer ring 1606, a sensor ring 1604, and a circular display monitor 1602 is separated from the main body 1608 by a small peripheral gap 1610. The outer ring 1606 may have an outer finish identical to that of the main body 1608, while the sensor ring 1604 and circular display monitor 1602 may have a common circular glass (or plastic) outer covering that is gently arced in an outward direction and that provides a sleek yet solid and durable-looking overall appearance. The sensor ring 1604 contains any of a wide variety of sensors, including infrared sensors, visible-light sensors, and acoustic sensors. The glass or plastic that covers the sensor ring 1604 may be smoked or mirrored such that the sensors themselves are not visible to the user. An air venting functionality may be provided, via the peripheral gap 1610, which allows the ambient air to be sensed by the internal sensors without the need for gills or grill-like vents.

Figures 17A, 17B:
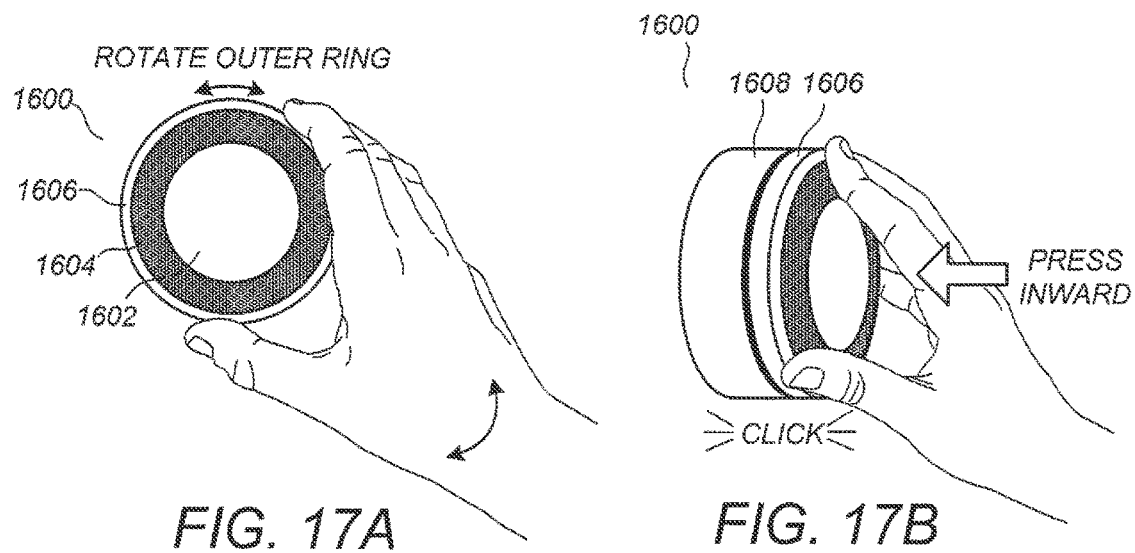
FIGS. 17A-17B illustrate the intelligent thermostat of FIG.16 being controlled by a user, according to some embodiments.

FIGS. 17A-17B illustrate the intelligent thermostat 1600 of FIG. 16 as it is being controlled by a user. The intelligent thermostat 1600 is controlled by two types of user input: (1) a rotation of the outer ring 1606 (FIG. 17A); and (2) an inward push on the outer ring 1606 (FIG. 17B) until an audible and/or tactile "click" occurs. The inward push may cause the outer ring 1606 to move forward, while in another implementation, the entire cap-like structure, including both the outer ring 1606 and the glass covering of the sensor ring 1604 and circular display monitor 1602, move inwardly together when pushed. The sensor ring 1604, the circular display monitor 1602, and the common glass covering do not rotate with outer ring 1606 in one implementation. In the drawings shown herein, the "z" direction is outward from the wall, the "y" direction is the toe-to-head direction relative to a walk-up user, and the "x" direction is the user's left-to-right direction.

By rotation of the outer ring 1606, or ring rotation, and inward pushing of the outer ring 1606, or inward click, the intelligent thermostat 1600 can receive all necessary information from the user for basic setup and operation. The outer ring 1606 is mechanically mounted in a manner that provides a smooth yet viscous feel to the user, for further promoting an overall feeling of elegance while also reducing spurious or unwanted rotational inputs. The intelligent thermostat 1600 recognizes three fundamental user inputs: (1) ring rotate left, (2) ring rotate right, and (3) inward click. In other implementations, more complex fundamental user inputs can be recognized, such as double-click or triple-click inward presses and speed-sensitive or acceleration-sensitive rotational inputs.

Figure 18A:
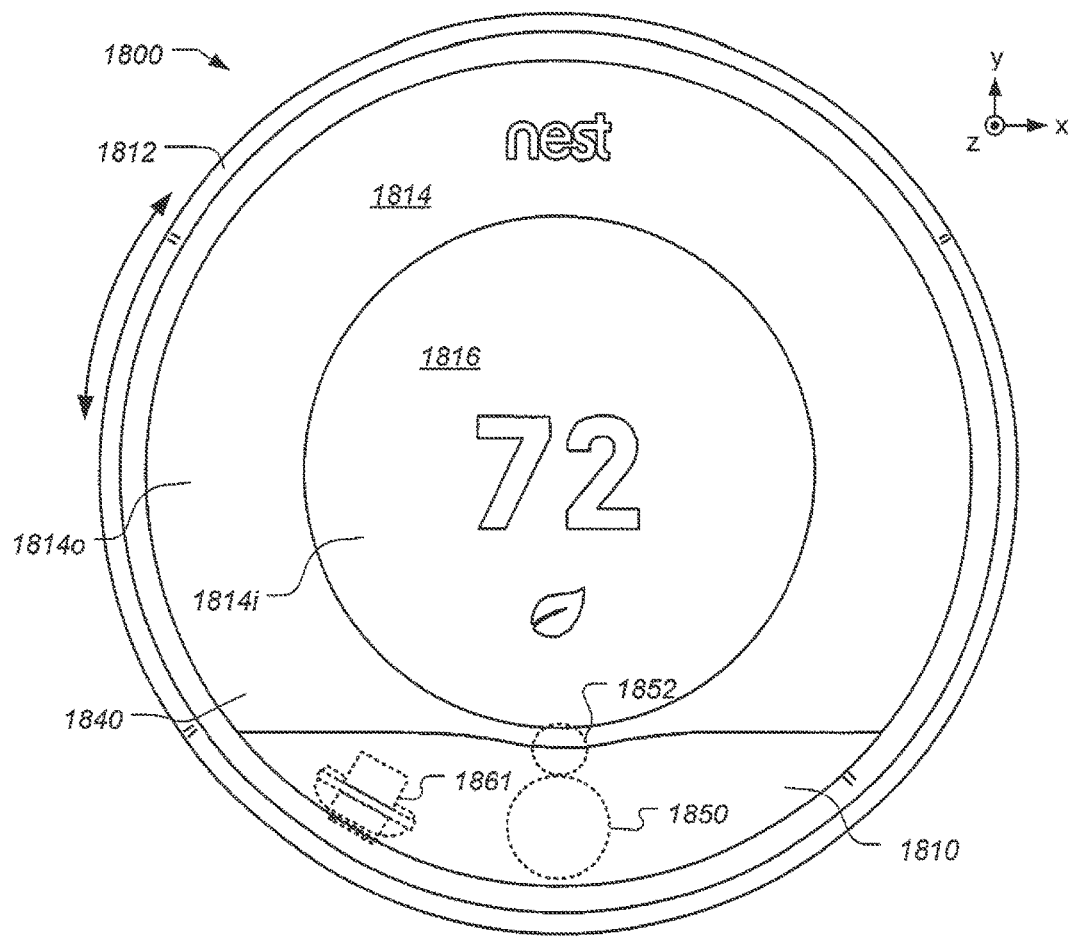
FIGS. 18A-18D illustrate front, bottom, side, and rear perspective views, respectively, of an intelligent thermostat, according to some embodiments.
Figure 18B:
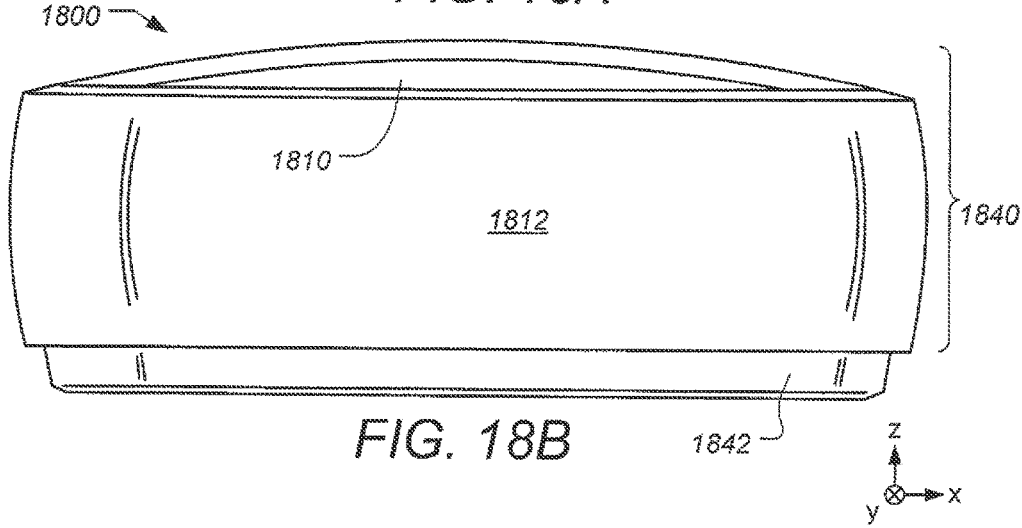
Figure 18C:
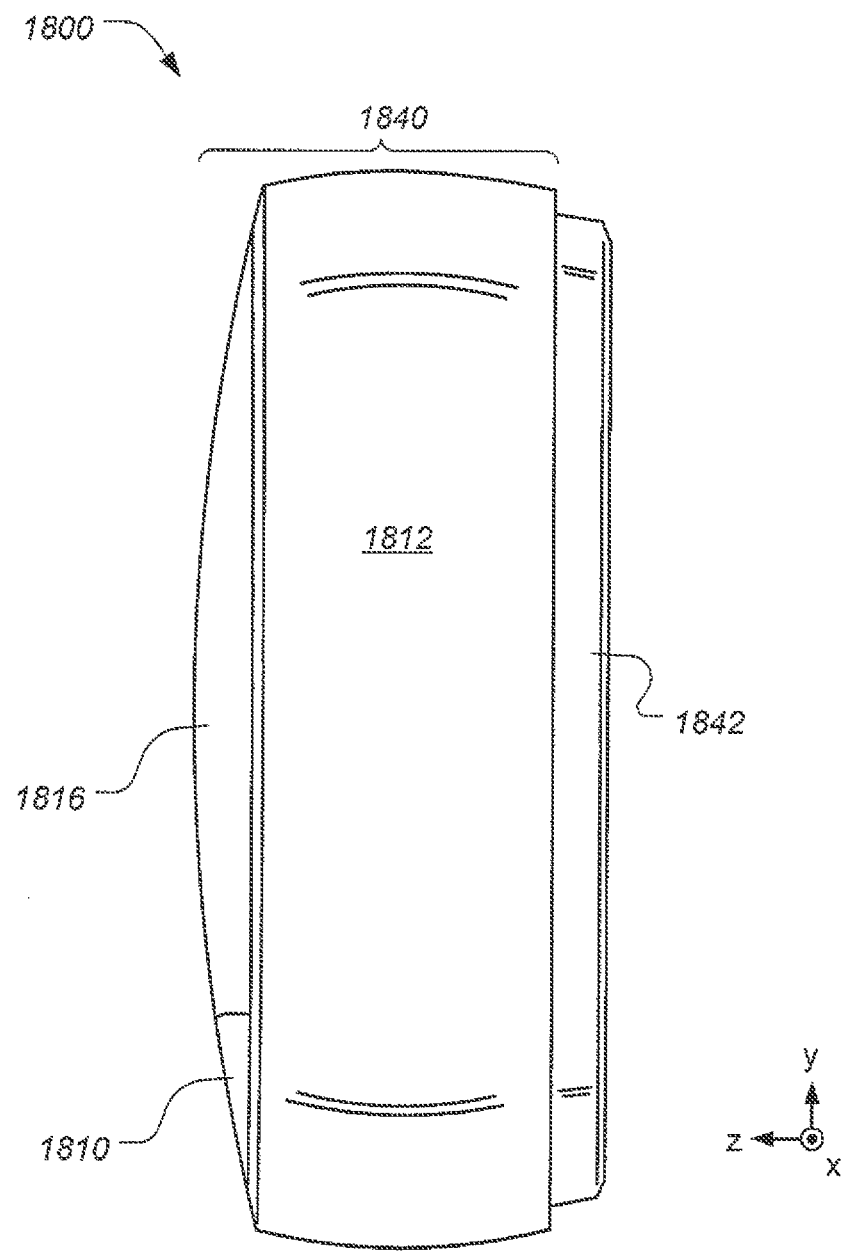
Figure 18D:
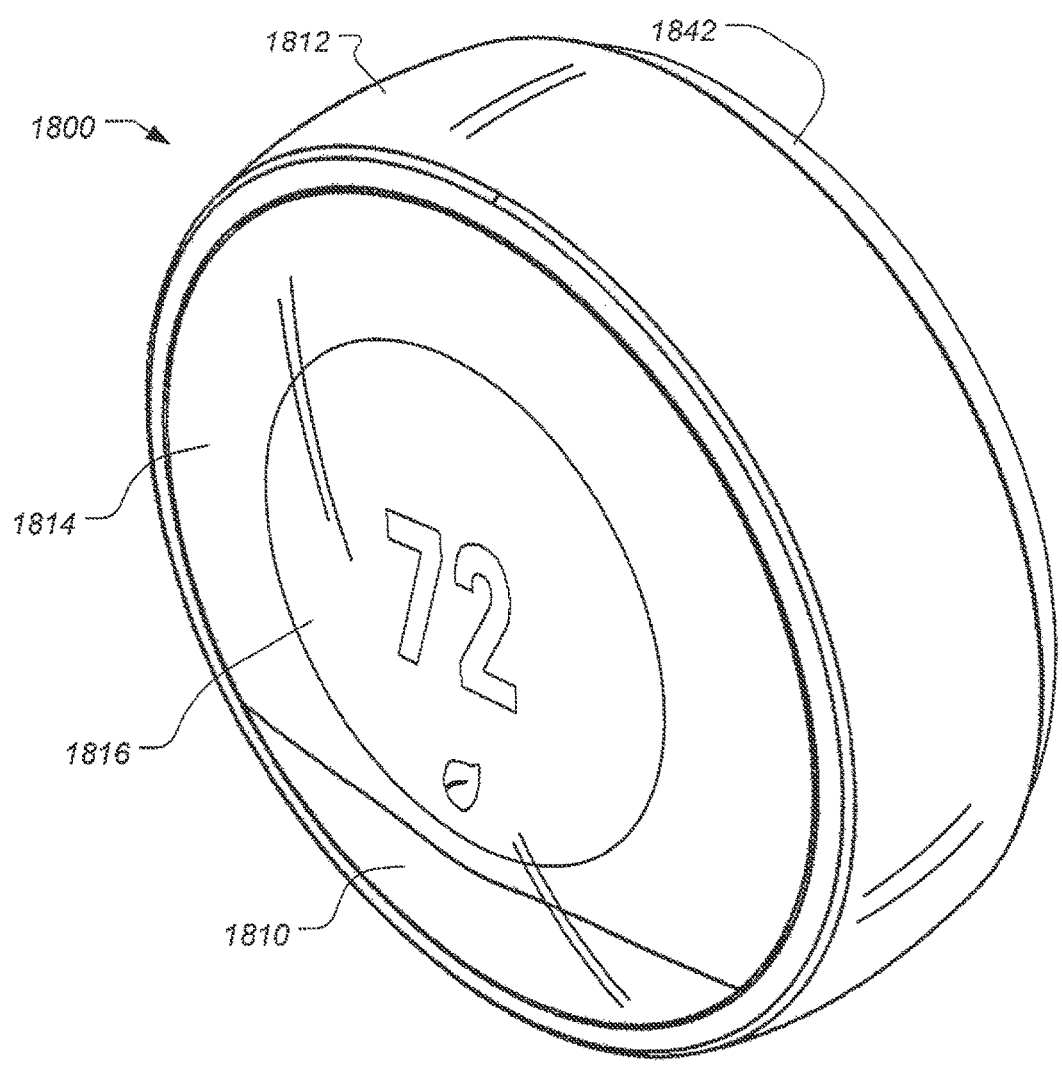

FIGS. 18A-18D illustrate an intelligent thermostat 1800 that is similar in certain respects to the intelligent thermostat 1600 of FIGS. 16-17B, supra, the intelligent thermostat 1800 having a visually pleasing, smooth, sleek and rounded exterior appearance while at the same time including multiple environmental sensors, multiple occupancy sensors, intelligent processing and logging capability, and network connectivity capability. FIG. 18A is front view, FIG. 18B is a bottom elevation view, FIG. 18C is a right side elevation view, and FIG. 18D is perspective view of intelligent thermostat 1800. Intelligent thermostat 1800 is wall mountable, is circular in shape, and has an outer rotatable ring 1812 for receiving user input. The outer rotatable ring 1812 allows the user to make adjustments, such as selecting a new setpoint temperature. Rotation of the outer ring 1812 can be sensed by an onboard optical finger navigation (OFN) module 1861 that is configured and positioned to sense movement of a textured surface on an inner surface of the outer ring 1812. The front face of the intelligent thermostat 1800 comprises a clear cover 1814 that according to some embodiments is polycarbonate, and a Fresnel lens 1810 having an outer shape that matches the contours of the curved outer front face of the intelligent thermostat 1800. For some embodiments, an inward pressing of the outer ring 1812 and/or the clear cover 1814 of the intelligent thermostat 1800 causes inward motion of the entire outer ring 1812 and cover 1814 ("inward click") toward the wall, and therefore a very large percentage of the visible portion of the intelligent thermostat 1800 moves toward the wall during an inward click. This can be contrasted with the intelligent thermostat 1600 of FIG. 16, supra, for which an inward pressing of the outer ring 1606 and/or the glass covering over display monitor 1602 and sensor ring 1604 causes an inward motion of the outer ring 1606 and glass covering toward the stationary circular main body 1608 to reduce the thickness of the peripheral gap 1610, and therefore a relatively modest percentage of the visible portion of the intelligent thermostat 1600 moves toward the wall during an inward click. Behind the Fresnel lens is a passive infrared sensor 1850 for detecting occupancy, i.e., for detecting the presence of a person who is generally in the same room or space as the intelligent thermostat 1800. As shown in FIGS. 18A-18D, the front edge of rotating ring 1812, front face 1814 and Fresnel lens 1810 are shaped such that they together form an integrated convexly rounded front face that has a common outward arc or spherical shape gently arcing outward.

Although being formed from a single lens-like piece of material such as polycarbonate, the cover 1814 has two different regions or portions including an outer portion 1814o that is painted or smoked and a central portion 1814i that is visibly clear so as to facilitate viewing of an electronic display 1816 disposed thereunderneath. According to one embodiment in which the diameter of the intelligent thermostat 1800 is about 80 mm, the diameter of the electronic display 1816 is about 45 mm. A second downwardly-tilted PIR sensor 1852 is provided to detect an approaching user, i.e., a person who is close enough that they may be intending to physically interact with the intelligent thermostat 1800 and/or may be intending to read the electronic display 1816. The proximity sensor 1852 can be used to detect proximity in the range of about one meter so that the intelligent thermostat 1800 can initiate "waking up" when the user is approaching the thermostat. Such use of proximity sensing is useful for enhancing the user experience by being "ready" for interaction or viewing as soon as, or very soon after, the user is ready to interact with or view the thermostat. Further, the wake-on-proximity functionality also allows for energy savings within the thermostat by allowing the electronic display 1816 and certain of its internal components to "sleep" when no user interaction or viewing is taking place or about to take place. Intelligent thermostat 1800 further comprises a rechargeable battery (not shown in FIGS. 18A-18D) and associated charging circuitry that uses power from the backplate 1842 that is obtained either via a common wire, if available, or from power harvesting (sometimes referred to as power stealing, power sharing, or parasitic powering) from one or more HVAC system call relay wire(s) if a common wire is not available, as described in U.S. Ser. No. 13/467,025, supra.

The intelligent thermostat 1800 further includes a processing system (not shown in FIGS. 18A-18D), a display driver (not shown in FIGS. 18A-18D), and a wireless communication system (not shown in FIGS. 18A-18D). The processing system is configured and programmed to carry out the governance of the operation of intelligent thermostat 1800 including various user interface features. The processing system is further programmed and configured to carry out other operations as described further hereinabove, hereinbelow and/or in other ones of the commonly assigned incorporated applications, such as, but not limited to: automated self-programming of an HVAC schedule based on user temperature setting inputs and other factors; automated and optimally-timed determination, based on historical occupancy statistics, that the house is likely unoccupied and corresponding automated temperature setback to reduce energy use during those times; automated prediction of an estimated time to reach a target temperature and corresponding displayed advisory on the user interface; automated data logging and uploading of data logs to a central cloud-based server; automated and optimized control of particular HVAC equipment, such as heat pumps, based on current and historical operating statistics and current and forecasted outside weather; automated gradual schedule migration (with informed user consent) to lower-energy settings over selected periods of time such that users are less likely to feel uncomfortable at the lower-energy temperature setpoints; automated generation and continuous updating of a home thermal model and HVAC characteristics for improved HVAC control; automated and optimized cooperation (with informed user consent) with utility demand-response event notifications by computation and continual updating of optimal temperature setpoint trajectories to maximize selected metrics of energy time-shifting while also minimizing selected metrics of user discomfort; and a variety of other useful and energy-saving, comfort-producing functionalities. In furtherance of these objectives, the wireless communications system is used to communicate with devices such as home wireless routers, other thermostats or HVAC system components, or other smart-home devices, with such communications being, for example, peer-to-peer communications, communications through one or more servers located on a private network, and/or communications through a cloud-based service.

Figure 19A:
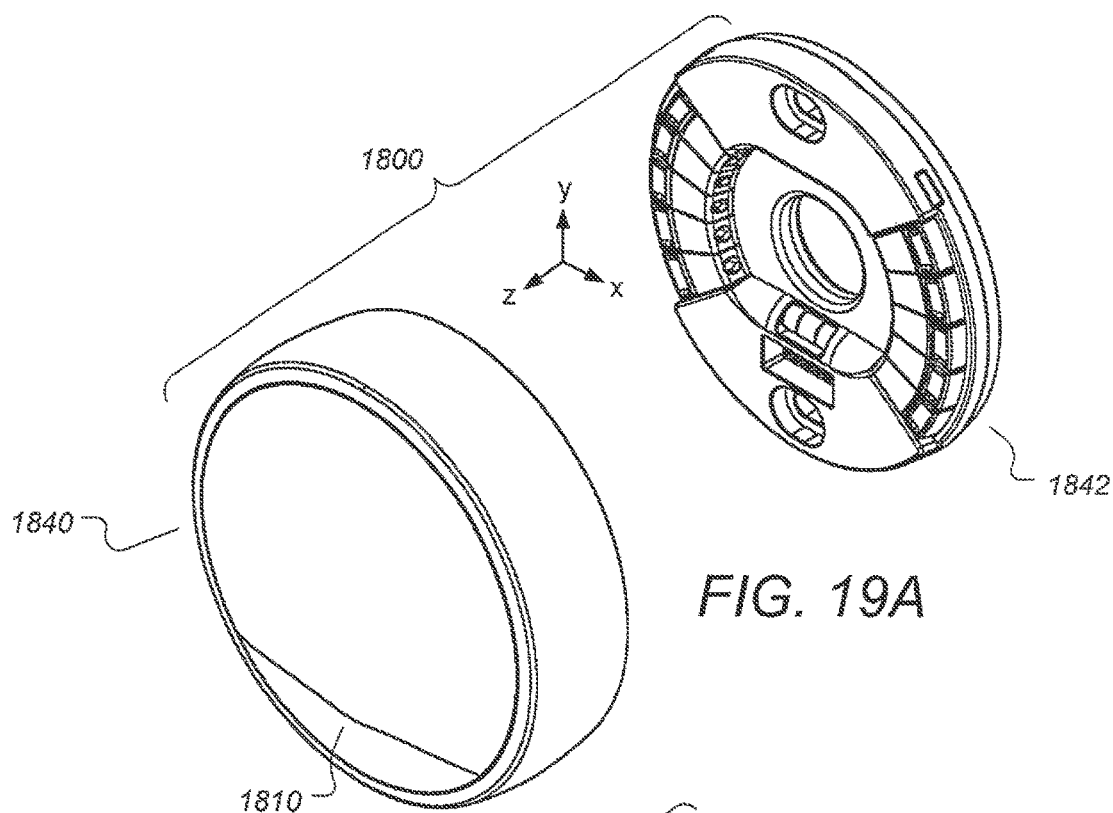
FIGS. 19A-19B illustrate exploded front and rear perspective views, respectively, of the intelligent thermostat of FIGS. 18A-18D, according to some embodiments.
Figure 19B:
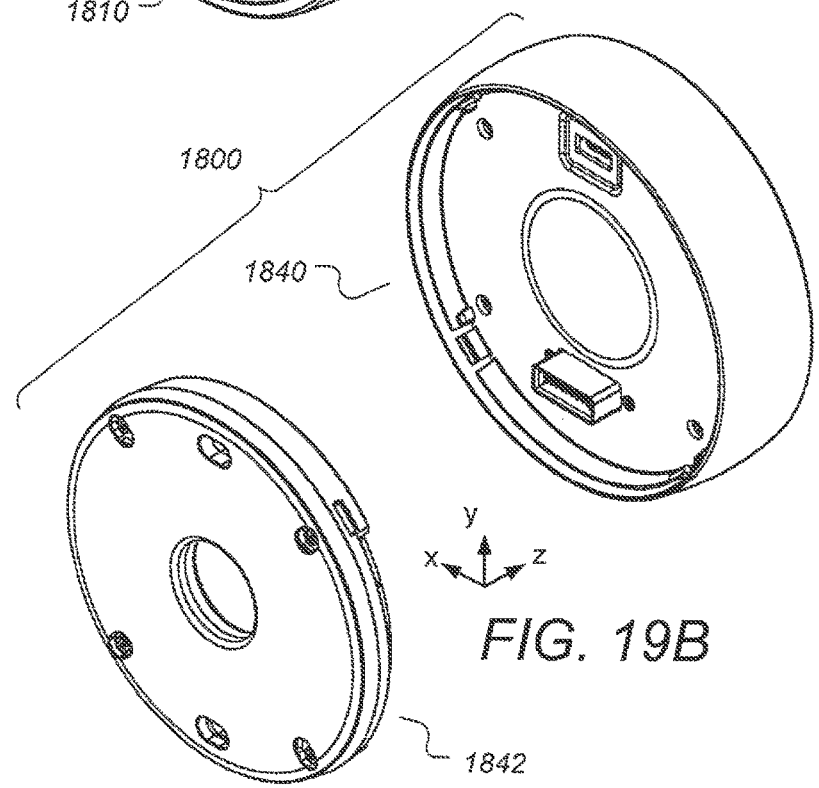

FIGS. 19A-19B illustrate exploded front and rear perspective views, respectively, of the intelligent thermostat 1800 with respect to its two main components, which are the head unit 1840 and the backplate 1842. For ease of installation, configuration and/or upgrading, especially by a non-expert installer such as a user, as well as for providing other features and advantages, the intelligent thermostat 1800 comprises a two-part mechanical assembly including a head unit 1840 and a backplate 1842. The backplate 1842 is configured and dimensioned to be affixed to a wall or other supporting surface, and comprises wiring terminals for coupling to HVAC wires that lead to the HVAC system being controlled. The head unit 1840 is removably mountable to the backplate 1842. Different portions of the functionality of the intelligent thermostat 1800 are judiciously apportioned between the head unit 1840 and the backplate 1842 such that a variety of different goals, objectives, and functionalities are achieved by virtue of their combination.

Figure 20A:
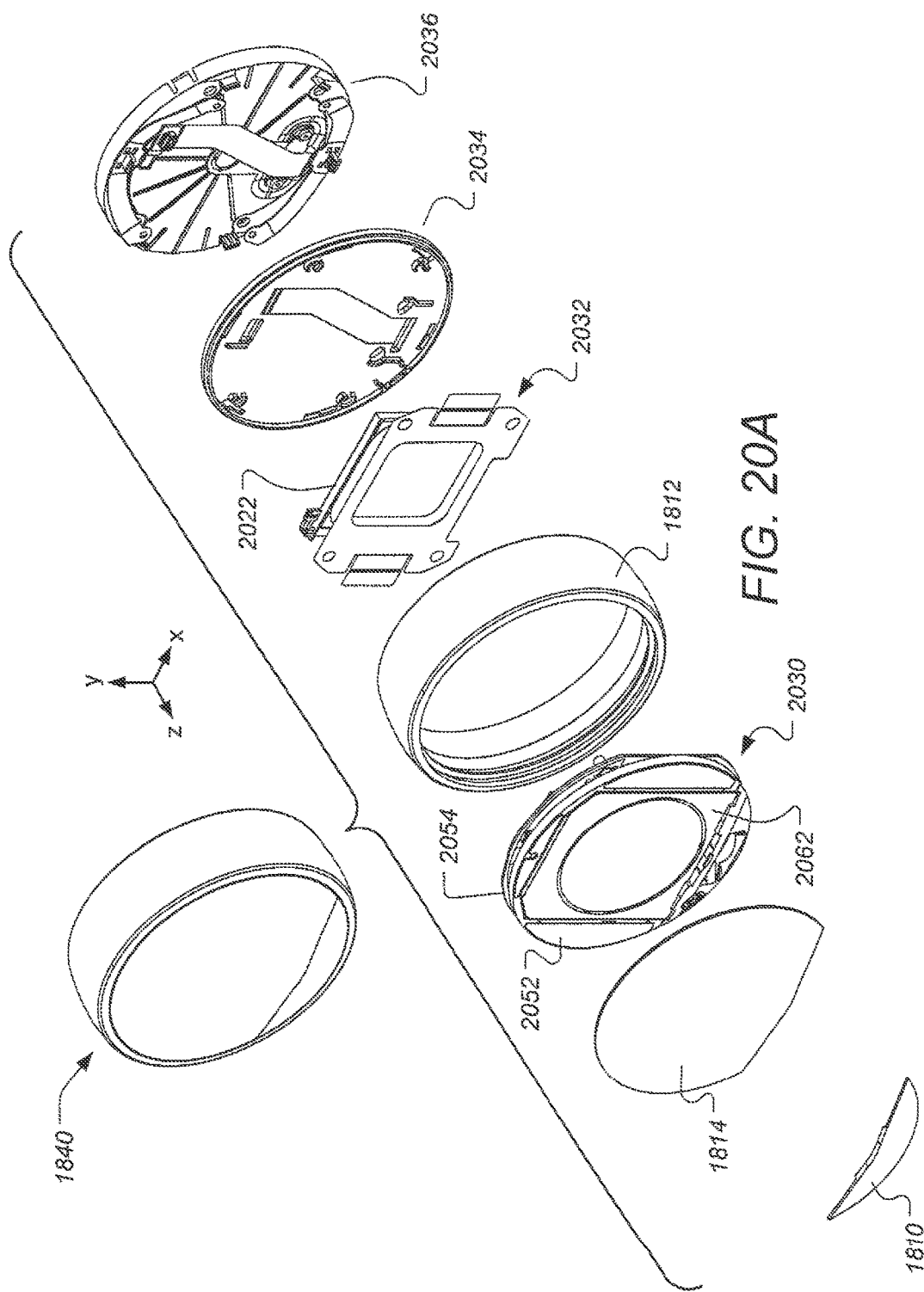
FIGS. 20A-20B illustrate exploded front and rear perspective views, respectively, of a head unit frontal assembly of the head unit of FIGS. 19A-19B, according to some embodiments.
Figure 20B:
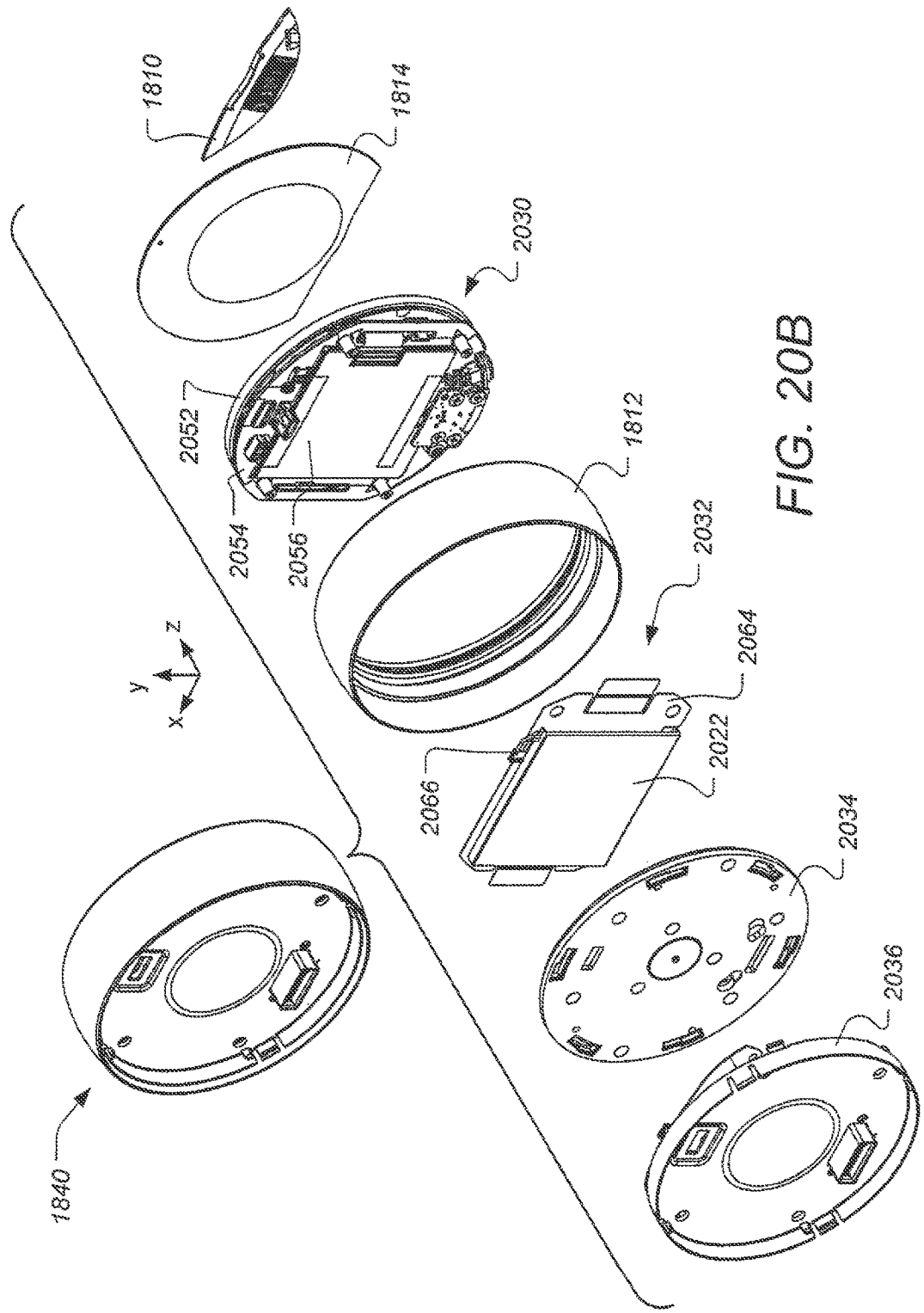

FIGS. 20A-20B illustrate exploded front and rear perspective views, respectively, of the head unit 1840 with respect to its primary components. Head unit 1840 includes a back cover 2036, a bottom frame 2034, a battery assembly 2032, the outer ring 1812 (which is manipulated for ring rotations), a head unit frontal assembly 2030, the front lens 1814, and the Fresnel lens 1810. Head unit frontal assembly 2030 includes a top frame 2052 that contains an LCD module 2062, and further comprises a head unit printed circuit board 2054 that contains a substantial portion of the head unit electronic components including processing, memory, wireless communication, powering and battery charging, and other electronic components. Electrical components on the head unit frontal assembly 2030 can connect to electrical components on the backplate 1842 by virtue of ribbon cables and/or other plug type electrical connectors on back cover 2036. According to some embodiments, circuitry and components are mounted on both sides of PCB 2054, while in other embodiments the majority of the circuitry and components are contained on the forward-facing side (i.e., facing outward from the wall) of the head unit PCB 2054. An RF shielding can 2056 (visible in FIG. 20B) surrounds most or all of the circuitry and components of the head unit PCB 2054 and serves to shield the circuitry and components from electromagnetic interference. The portion of RF shielding 2056 that is visible in FIG. 20B shields the underside of the electrical components on the forward-facing side of the PCB 2054. The RF shielding 2056 is also present over the forward-facing side of the PCB 2054 (not visible in FIG. 20B) such that those components are fully surrounded by RF shielding.

Battery assembly 2032 includes a rechargeable Lithium-Ion battery 2022, which for one preferred embodiment has a nominal voltage of 3.7 volts and a nominal capacity of 560 mAh. To extend battery life, however, the battery 2022 is normally not charged beyond 450 mAh by the thermostat battery charging circuitry. Moreover, although the battery 2022 is rated to be capable of being charged to 4.2 volts, the thermostat battery charging circuitry normally does not charge it beyond 3.95 volts. Battery assembly 2032 also includes connecting wires 2066, and a battery mounting film 2064 that is attached to battery 2022 using a strong adhesive and to the rear shielding can 2056 of head unit PCB 2054 using a relatively weaker adhesive. By using a weaker adhesive to mount the film 2064 of battery assembly 2032 to shielding can 2056 of the PCB 2054, subsequent replacement of battery assembly 2032 (including battery 2022) is facilitated. According to some embodiments, the battery assembly 2032 is user-replaceable.

Figure 21A:
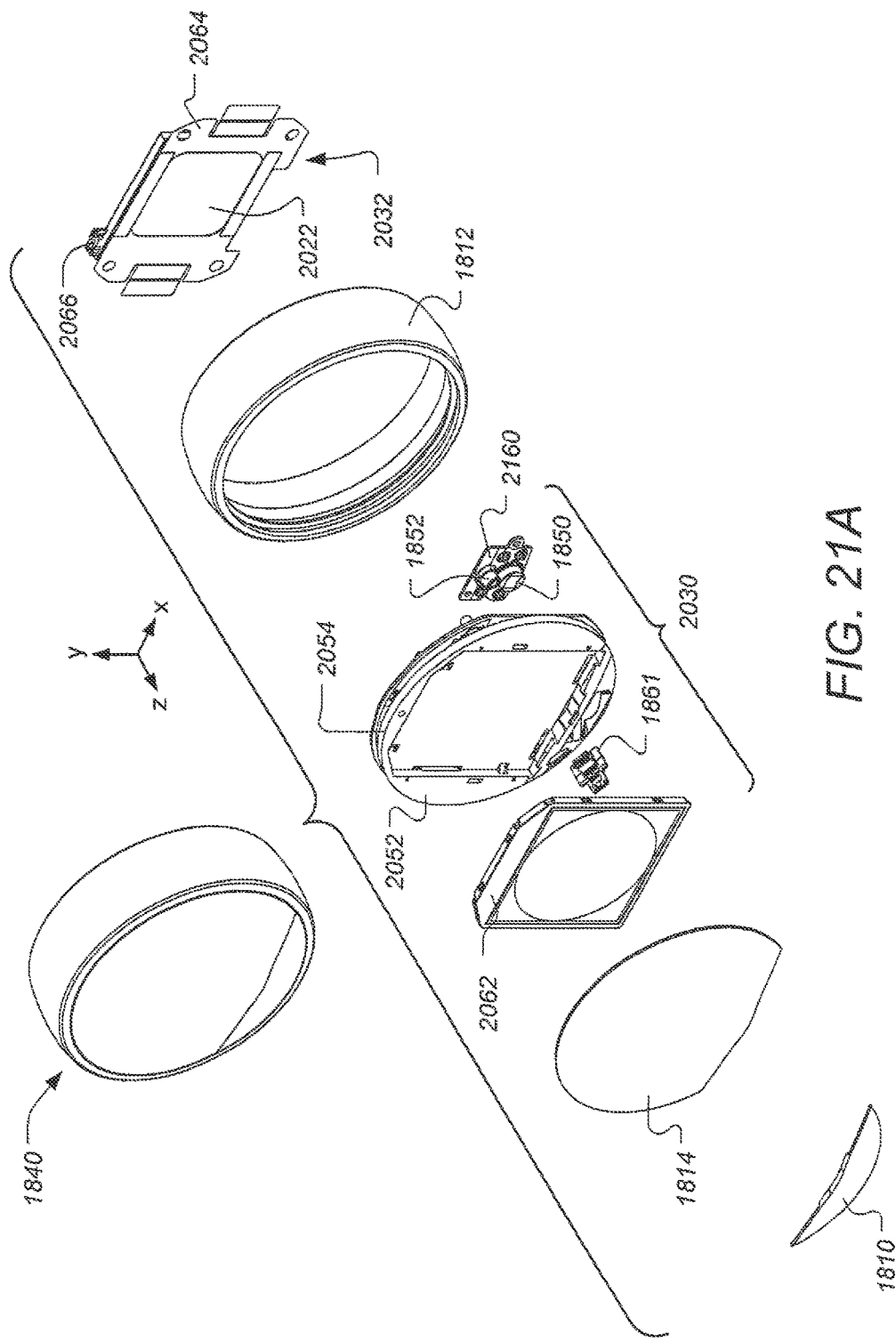
FIGS. 21A-21B illustrate exploded front and rear perspective views, respectively, of a backplate of the intelligent thermostat, according to some embodiments.
Figure 21B:
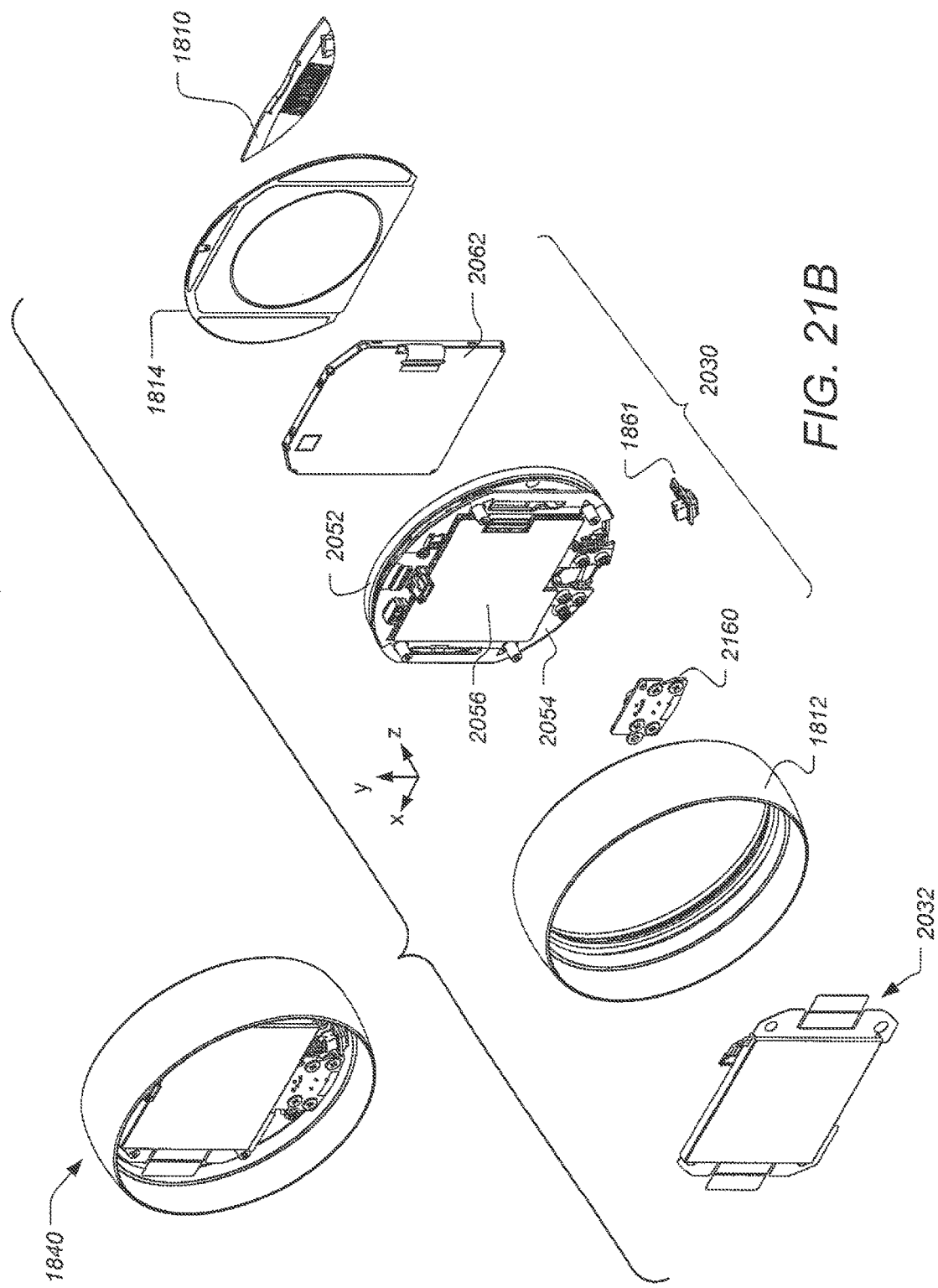

FIGS. 21A-21B illustrate additional exploded front and rear perspective views, respectively, of the head unit 1840, with further illustration of enumerated components of the head unit frontal assembly 2030. Head unit frontal assembly 2030 comprises the head unit top frame 2052, the head unit PCB 2054, and the LCD module 1861. As illustrated, the optical finger navigation module 1861 (see FIG. 18A, supra) is implemented as a daughter board that connects to the head unit PCB 2054 and is positioned thereon so that it can sense rotation of the outer ring 1812. The OFN module 1861 is directed radially outwardly (that is, perpendicular to the z-axis and away from the center of the thermostat). The OFN module 1861 uses methods analogous to the operation of optical computer mice to sense the movement of a textured surface on an inner face of the outer ring 1812. Notably, the OFN module 1861 is one of the very few sensors that are controlled by a relatively power-intensive head unit microprocessor rather than a relatively low-power backplate microprocessor, which are discussed further with respect to FIGS. 26-27, infra. Among other functions, the relatively low-power backplate microprocessor is used for polling and controlling sensors for temperature, humidity, infrared proximity, ambient light level detection, and inward-click user inputs so that the relatively high-powered head unit microprocessor can be in a low-power sleep state for most of the time. Notably, control of the OFN module 1861 by the head unit microprocessor can be achieved without confounding this power conservation strategy, because the head unit processor will already be awake (by virtue of detection by the PIR motion sensors 1850/1852) by the time the user manually turns the rotatable ring 1812. Advantageously, very fast response to the user's turning of the rotatable ring 1812 can be provided by the head unit microprocessor.

Also visible in FIGS. 21A-21B is Fresnel lens 1810 that operates in conjunction with the two PIR motion sensors 1850 and 1852 (see FIG. 18A, supra) that are mounted on a PIR mini-board 2160, which in turn attaches to the back side (i.e., the wall-facing side) of PCB 2054. Openings at corresponding locations of the top frame 2052 and PCB 2054 allow infrared radiation that has passed through Fresnel lens 1810 to impinge upon the PIR motion sensors 1850 and 1852. Two or more temperature sensors are also located in the head unit 1840 and cooperate to acquire reliable and accurate room temperature data. One of the temperature sensors is located on the daughter board of the OFN module 1861 and the other is mounted on the head unit PCB 2054.

FIGS. 22A-22B illustrate exploded front and rear perspective views, respectively, of the backplate unit 1842. Backplate unit 1842 comprises a backplate rear plate 2282, a backplate circuit board 2280, and a backplate cover 2270. Visible in FIG. 22A are HVAC wire connectors 2284 that include integrated mechanical wire insertion sensing circuitry, and relatively large capacitors 2286 that are used by part of the power stealing circuitry that is mounted on the backplate circuit board 2280. According to some embodiments, backplate circuit board 2280 includes a microcontroller, electronic circuitry that achieves HVAC actuation functionality (i.e., connecting and disconnecting different pairs of HVAC wire terminals according to the required HVAC function), and various functional support and power electronics. For some embodiments, the HVAC switching and powering functionalities can be similar to that described in U.S. Ser. No. 13/467,025 , supra. For some embodiments, the backplate circuit board 2280 further contains a temperature/humidity sensor integrated together in a common IC chip. Wire connectors 2284 are provided to allow for connection to HVAC system wires, which pass though the large central circular opening 2290 when the backplate unit 1842 is mounted to the wall. Also visible in FIGS. 22A-22B are two mounting holes 2292 and 2294 for use in fixing the backplate to the wall. The laterally extending mounting holes 2292 and 2294, together with an integrated bubble level 2272 and bubble level holder 2274 facilitate leveling during installation without requiring an external leveling gauge, thereby further enhancing the ease of a non-expert installation of the intelligent thermostat 1800.

Figure 23:
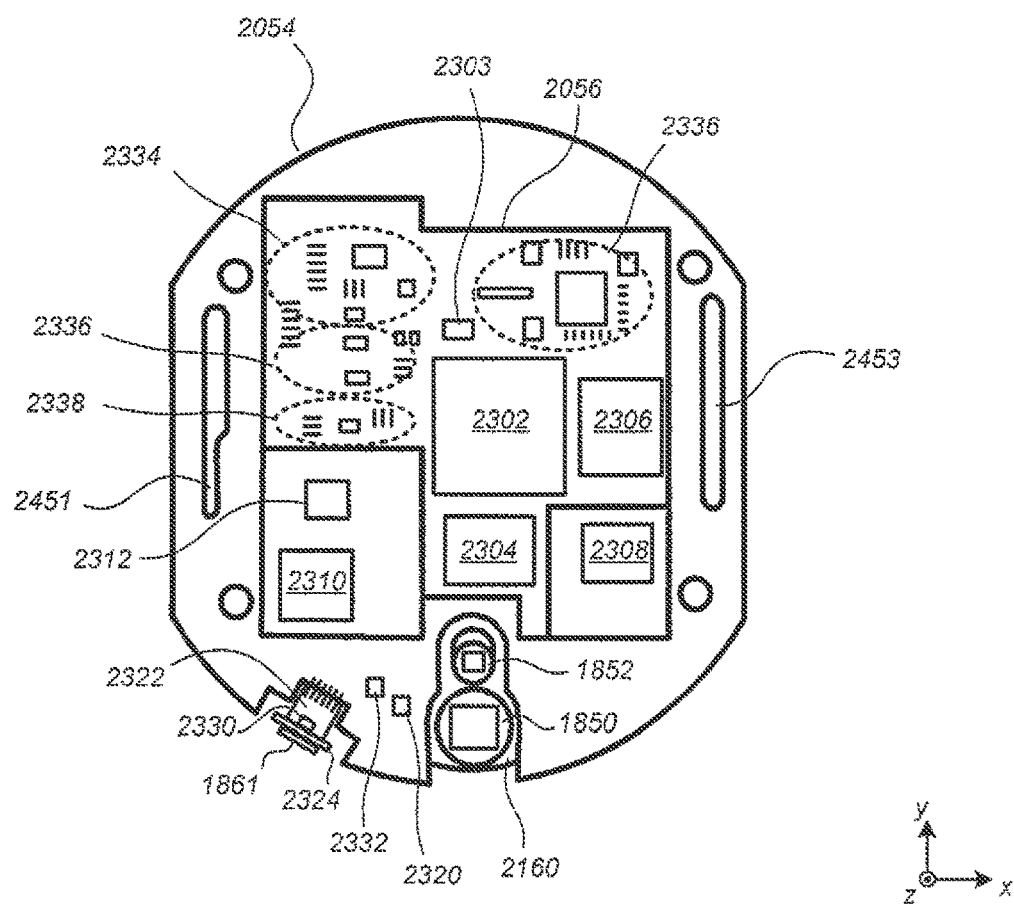
FIG. 23 illustrates a front view of a head unit circuit board of the head unit, according to some embodiments.

FIG. 23 illustrates a front aerial view of the head unit PCB 2054. The head unit circuit board 2054 comprises a head unit microprocessor 2302, such as a Texas Instruments AM3703 chip, and an associated oscillator 2303, along with DDR SDRAM memory 2304 (which may be, for example, 64 MB or greater in size), and mass NAND flash storage 2306 (which may be, for example, 256 MB or greater in size). A Wi-Fi module 2308, such as a Murata Wireless Solutions LBWA19XSLZ module, which is based on the Texas Instruments WL1270 chipset supporting the 802.11 b/g/n WLAN standard, is provided in a separate compartment of RF shielding 2056 for Wi-Fi capability. Associated with Wi-Fi module 2308 is supporting circuitry (not shown) such as a 26 MHz crystal oscillator (not shown). Head unit PCB further comprises an IEEE 802.15.4-compatible wireless communication module 2310, such as an Ember EM357 chip available from Silicon Laboratories, Inc., also in a separately shielded RF compartment. Using a protocol that is compatible with IEEE 802.15.4, which is a standard that specifies the physical and media access control layers for relatively low-rate wireless personal area networks, the intelligent thermostat 1800 may be provided with an ability to communicate directly with different smart-home sensors for achieving any of a variety of useful environmental control and monitoring objectives. Associated with the IEEE 802.15.4 module 2310 is supporting circuitry such a 24 MHz crystal oscillator (not shown) and a front end chip 2312, such as a SKY65384 Front-End Module available from Skyworks Solutions, Inc., that comprises a transmit amplifier, a low-noise amplifier for receive, and a transmit/receive switch. Preferably, both the Wi-Fi module 2308 and IEEE 802.15.4 module 2310 are dynamically programmable, with programs for each being stored in the mass NAND flash storage 2306 and loaded thereon upon reboot, which provides an ability for respective -new, different, or updated programs to be downloaded from a central server, stored in the mass NAND flash storage 2306, and then loaded into the respective wireless modules 2308/2310.

Head unit PCB 2054 further includes the PIR mini-board 2160 that is screw-mounted thereto (screws not shown) below the plane thereof, the PIR mini-board 2160 for supporting the forward-facing (occupancy detecting) PIR detector 1850, and the diagonally-downward-facing (proximity detecting) PIR detector 1852, such that each of the PIR detectors protrudes through an inwardly extending opening of the head unit PCB 2054. By way of example and not by way of limitation, the forward-facing (occupancy detecting) PIR detector 1850 may be a PYD 1794 pyroelectric detector, and the diagonally-downward-facing (proximity detecting) PIR detector 1852 can be a PYD 5731 pyroelectric detector, both available from Excelitas Technologies Corp.

Head unit PCB 2054 further includes a physical/electrical connector 2322 that mounts thereto inside of an inwardly facing recess along a perimeter thereof. Mateably attached to the physical/electrical connector 2322 is a daughterboard 2324 that, when so attached, rises perpendicular to the head unit PCB 2054 (i.e., in the z-direction in FIG. 23). Mounted on an outwardly facing surface of the daughterboard 2324 is the optical finger navigation (OFN) module 1861 (see FIG. 18, supra) for tracking rotation of the outer ring 1812. By way of example, the OFN module 1861 can be an ADBS-A350 OFN Sensor available from Avago Technologies. Mounted on an inwardly facing surface of the daughterboard 2324, and rising substantially above the plane of the head unit PCB 2054, is a first temperature sensor 2330. Mounted on the surface of the head unit PCB 2054 is a second temperature sensor 2332, along with a nearby ambient light sensor (ALS) module 2320. The temperature sensors 2330 and 2332 can each be, for example, a TMP112 Digital Temperature Sensor available from Texas Instruments.

Head unit PCB further includes, inside the RF shielding 2056, battery charging circuitry 2334, preferably including an LTC4085-3 chip available from Linear Technologies Corporation, or other devices or circuitry that provides equivalent functionality and advantages. The LTC4085-3 is a USB power manager and Li-Ion/Polymer battery charger chip originally developed for portable battery-powered applications. Head unit PCB 2054 further includes main power management circuitry 2336 including DC/DC step-down conversion and voltage regulation circuitry. Head unit PCB 2054 further includes piezoelectric driving circuitry 2336 for actuating a piezoelectric buzzer that is mounted on a bottom surface of a top lid of the RF shielding 2056, for providing optional audible sounds such as a "tick" sound responsive to user ring rotations. Head unit PCB 2054 further includes display backlight voltage generation circuitry 2338.

Slotted openings 2451 and 2453 are provided in the head unit PCB 2054 to facilitate mechanical assembly including providing space for ribbon cables, such as a ribbon cable that runs from the back side of head unit PCB 2054 to the LCD module 2062 (see FIG. 20A, supra). Two RF antennae (not shown) are provided in the head unit PCB 2054, the antennae running alongside the respective slotted openings 2451 and 2453.

Figure 24:
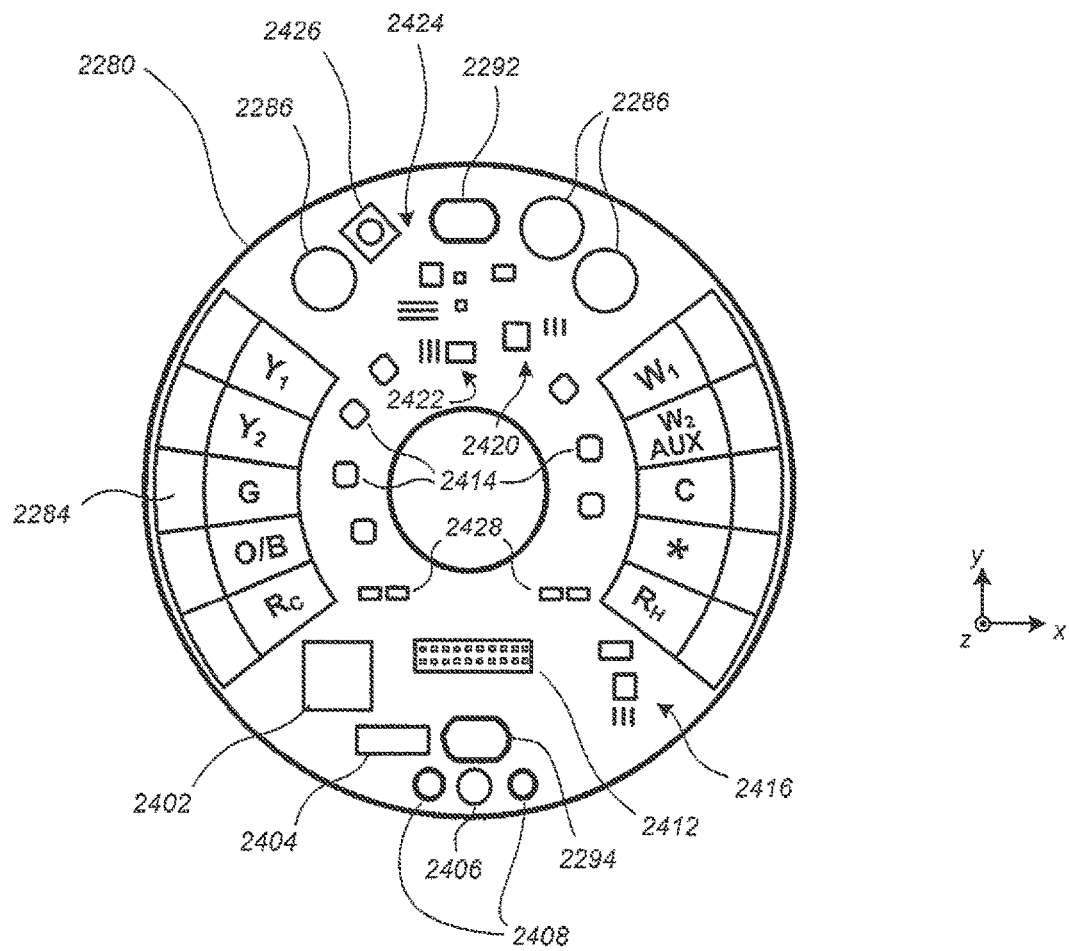
FIG. 24 illustrates a front view of a backplate circuit board of the backplate, according to some embodiments.

FIG. 24 illustrates an aerial view of the backplate circuit board 2280. The backplate circuit board 2280 comprises a backplate processor/microcontroller 2402 that is responsible for generally orchestrating the operation of the backplate 1842, including activating the switching circuits coupled to the HVAC wires, and that is furthermore is responsible for controlling and polling most of the environmental sensors of the thermostat 1800. The backplate processor/microcontroller 2402 may comprise, for example, an ST Micro STM32L151VB microcontroller unit that may include, for example, an ultra-low-power ARM 32-bit Cortex-M3 CPU, 128 Kbytes of flash memory, 16 kB of RAM, and various other components such as direct memory access controllers, analog to digital converters, input/output ports, communication interfaces, and so forth for achieving the described functionalities.

To maximize the amount of time for which the relatively high-powered head unit processor 2302 of FIG. 23 supra can remain in a low-power sleep state, it is preferably the relatively low-powered backplate processor/microcontroller 2402 that controls and polls not only the sensors contained in the backplate 1842, but that also controls and polls most of the sensors contained in the head unit 1840. For one embodiment, in addition to controlling and polling a temperature/humidity sensor chip 2406 contained on the backplate circuit board 2280, the backplate processor/microcontroller 2402 furthermore controls and polls every sensor contained in the head unit 1840 except for the optical finger navigation (OFN) module 1861. As such, the backplate processor/microcontroller 2402 controls and polls the following components of the head unit 1840: the first temperature sensor 2330, the second temperature sensor 2332, the ambient light sensor (ALS) 2320, the forward-facing (occupancy detecting) PIR detector 1850, and the diagonally-downward-facing (proximity detecting) PIR detector 1852. Electrical connectivity between the backplate processor/microcontroller 2402 and the subject head unit sensors is achieved using a 20-pin connector 2412, along with one or more port expanders on the head unit circuit board, by which the electrical connections are established when the head unit 1840 is mated to the backplate 1842. Backplate circuit board 2280 further comprises a timing crystal chip 2404 that may provide, for example, a 32.768 kHz signal that may be used by the backplate processor/microcontroller 2402 for timing reference purposes. The backplate processor/microcontroller 2402 performs, in addition to the controlling and polling of the various sensors, sensing for mechanical wire insertion at installation, alerting the head unit regarding current vs. setpoint temperature conditions and actuating the switches accordingly, and other functions such as looking for appropriate signals on the inserted HVAC wires at installation and thereafter.

Backplate circuit board 2280 further comprises the combined temperature/humidity sensor chip 2406 positioned near a lower periphery thereof. The temperature/humidity sensor chip 2406 can comprise, by way of example and not by way of limitation, a Sensirion SHT21 module. Thermal isolation of the temperature/humidity sensor chip 2406 from the rest of the backplate circuit board 2280 is facilitated by virtue of the lower mounting through-hole 2294 along with two additional through-holes 2408. Further disposed on the backplate circuit board 2280 in an arcuate arrangement neararound a peripheral portion of thereof are the HVAC wire connectors 2284 that include integrated mechanical wire insertion sensing capability, which are further described in U.S. Ser. No. 13/624,878, supra.

Backplate circuit board 2280 further comprises encapsulated transformer/diode circuits 2414 that are used for transformer-based isolation of the control and logic circuitry from the HVAC connection and switching circuitry, as described in U.S. Ser. No. 13/034,674, supra. Disposed on the back side of the backplate circuit board 2280 (not shown) are field effect transistor (FET) switches (not shown) that perform the HVAC switching functionality and that are electrically disposed on the isolated HVAC connection and switching circuitry side of the transformer/diode circuits 2414. The FET switches perform, inter alia, the basic closing and opening between the requisite HVAC terminals according to the desired HVAC function. As described in U.S. Ser. No. 13/467,025, supra, one or more of the FET switches (not shown) are also judiciously configured and controlled to facilitate power stealing during active HVAC cycles for circumstances in which there is no "C-wire" available to power the thermostat 1800. The use of FETs in the switching circuitry allows for active power stealing, i.e., taking power during the HVAC ON cycle, by briefly diverting power from the HVAC relay circuit to the reservoir capacitors for a very small interval, such as 100 micro-seconds. This time is small enough not to trip the HVAC relay into the OFF state but is sufficient to charge up the reservoir capacitors. The use of FETs allows for this fast switching time (100 micro-seconds), which would be difficult to achieve using relays (which stay on for tens of milliseconds). Also, such relays would readily degrade with fast switching, and they would also make audible noise. In contrast, the FETS operate with essentially no audible noise.

Backplate circuit board 2280 further comprises various other DC-power generation circuitry for providing power that is used by the backplate processor/microcontroller 2402, the environmental sensors controlled thereby, the various other backplate circuit board components, and for providing a DC power rail voltage (e.g., 4.4 VDC) that is input to the battery charging circuitry of the head unit 1840. Operation of the various DC-power generation circuitry is described in U.S. Ser. No. 13/034,674, supra, U.S. Ser. No. 13/034,678, supra, and/or U.S. Ser. No. 13/467,025, supra. Such DC-power generation circuitry includes, for example, bootstrap and primary LDO circuitry 2416, bridge rectifier circuitry 2420, the relatively large storage capacitors 2286, soft-start circuitry 2422, and buck converter circuitry 2424 including inductor 2426. Backplate circuit board 2580 further comprises wire insertion sensing and voltage sensing circuitry 2428, further portions of which are located on the back side of the backplate circuit board 2280.

FIGS. 25A-25B present tables that are examples of the kinds of registration data and operational data that can be collected for an intelligent thermostat. In particular, FIG. 25A illustrates a table 2500 that represents an example of registration data and registration data elements. Second column 2502 represents nine examples of registration data an intelligent-thermostat user may be asked to provide in response to simple questions in a setup dialog or registration questionnaire. First column 2501 represents registration data elements of a registration data vector $\vec{R}$ assigned to numerically represent the registration data in column 2502. For example, registration data element $r_1$ is a numerical representation of a zip code that may be used to identify a region of a country in which the intelligent thermostat is located. Registration data element $r_6$ represents an HVAC system model, such as the model number of a heating unit or the model number of an air conditioner. Of course it is understood that more than one registration data element can be used to represent an HVAC system, because a home may have more than one heating unit and/or more than one air conditioning unit. In which case, a different registration data element can be assigned to represent each of the unit models.

FIG. 25B illustrates a table 2510 that represents an example of operational data collected and generated by the intelligent thermostat. Second column 2512 represents operational data entered by the intelligent thermostat user, collected by intelligent-thermostat sensors, and generated by the intelligent thermostat. First column 2511 represents operational data elements of an operational data vector $\vec{Q}$ assigned to numerically represent the operational data in column 2512. For example, operational data element $q_1$ represents thermostat settings such as a user input setpoint for when the intelligent thermostat is to increase the temperature. Of course it is understood that more than one operational data element can be used to represent different setpoints and associated temperatures.

Figure 26A:
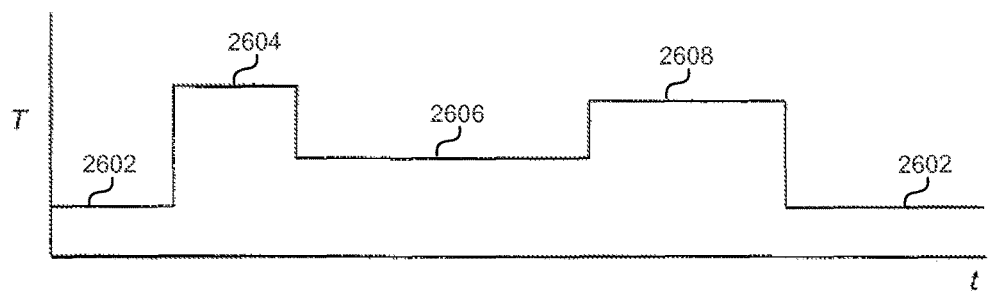
FIGS. 26A-26F illustrate information processed and generated by an intelligent thermostat during control operations, according to some embodiments.
Figure 26B:
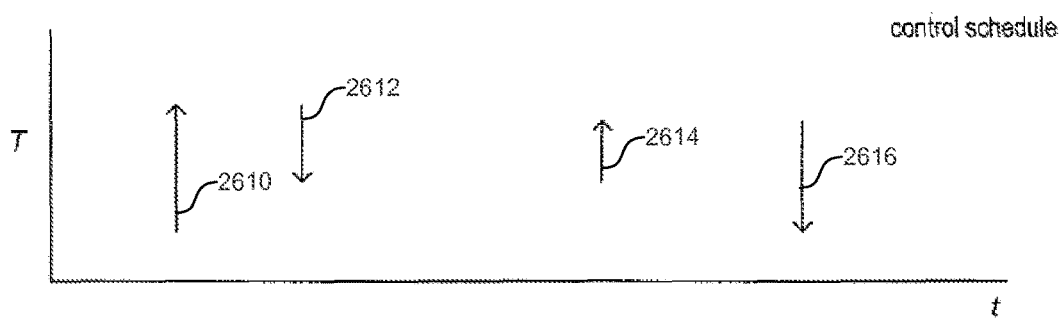

FIG. 26A illustrates a plot of user desired temperatures an intelligent thermostat is directed to achieve according to the thermostat settings. The specification indicates that the temperature is desired to be initially low 2602, then rise to a high temperature 2604, then subsides to an intermediate temperature 2606, then rise to a relatively high temperature 2608, and then drops to the low temperature 2602. The temperature control specification can be visually displayed to the user on the intelligent thermostat interface or on an organization or vender website. FIG. 26B shows a control schedule corresponding to the control specification illustrated in FIG. 26A. The control schedule includes a temperature increase 2610, a temperature decrease 2612, a temperature increase 2614, and temperature decrease 2616 that correspond to the user input thermostat settings. The directional arrows correspond to setpoints, or indications of desired temperature changes, at particular points in time as set by the user.

Figure 26C:
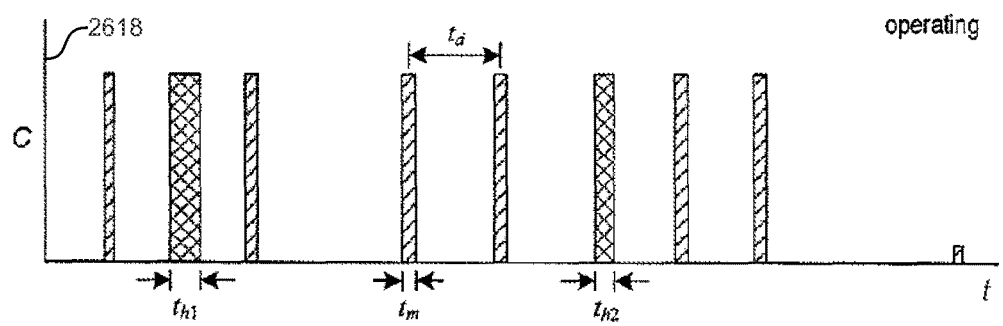

Returning to FIG. 25B, operational data element $q_2$ can represent a heating unit daily total average runtime. Operation data elements $q_3$ through $q_{11}$ represent examples of the kinds of computed operational data the intelligent thermostat can calculate over a fixed period of time, such as daily, weekly, or monthly. In particular, operational data elements $q_3$ through $q_8$ represent the average time to increase, decrease, or maintain a temperature setting. FIG. 26C illustrates a plot of control output from the intelligent thermostat to the HVAC system that might result from the intelligent thermostat attempting to maintain the desired control specification illustrated in FIG. 26A. Vertical axis 2618 represents the magnitude of a control signal. Each bar represents the magnitude of an output control signal over time. The control output may be a current or voltage signal sent from the intelligent thermostat to a heating unit, with a high-voltage signal indicating that the heating unit should be currently operating and a low- or no voltage output indicating that the heating system should not be operating. The width of each bar represents the amount of time the heating unit is operating, cross-hatched bars represent the heating unit operated to increase the temperatures according to the control schedule, and hash-marked bars represent the heating unit operated to maintain a desired temperature setting. The times the heating unit is operated to increase the temperature is denoted by $t_{h1}$ and $t_{h2}$, the times the heating unit is operated to maintain a desired temperature is denoted by $t_m$, and the time between operating the heating unit to maintain a desired temperature is denoted by $t_d$. The intelligent thermostat can calculate and record the average time to increase the temperature, calculate and record the average time to maintain a desired temperature, and calculate and record the time between operating the heating unit to maintain a desired temperature.

Figure 26D:
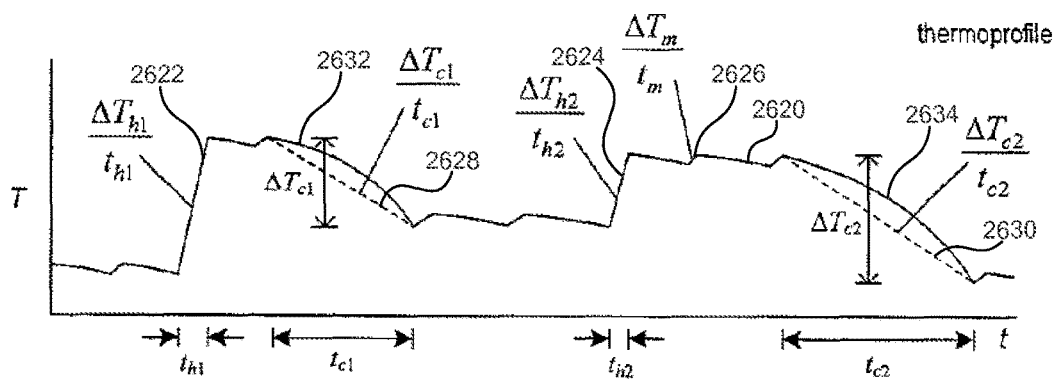

Returning to FIG. 25B, operational data elements $q_9$, $q_{10}$, and $q_{11}$ can represent average rates for temperatures to increase from low to high temperature settings, to increase during a maintenance period, to decrease from high to low temperature settings. FIG. 26D illustrates a plot of a thermoprofile. Curve 2620 represents temperature changes measured by the intelligent thermostat sensors over time. Positively sloped line segments 2622 and 2624 represent the rate of temperature increase from low to higher temperatures (i.e., $\Delta T_{h1}/t_{h1}$ and $\Delta T_{h2}/t_{h2}$) and correspond to setpoints 2610 and 2614. Short positively sloped line segments 2626 represent the rate of temperature increase needed to maintain a temperature setting (i.e., $\Delta T_m/t_m$). On the other hand, negatively sloped dashed line segments 2628 and 2630 represent approxiate rate of temperature decrease (i.e., $\Delta T_{c1}/t_{c1}$ and $\Delta T_{c2}/t_{c2}$) associated with curved segments 2632 and 2634, respectively.

It should be noted that the operational data in column 2511 of FIG. 25B is not intended to be exhaustive to the kinds of data that can be collected and processed by an intelligent thermostat. The intelligent thermostat can collect and process other kinds of data, such as when people are present or when the lights are turned on or off, as described above.

Figure 26E:
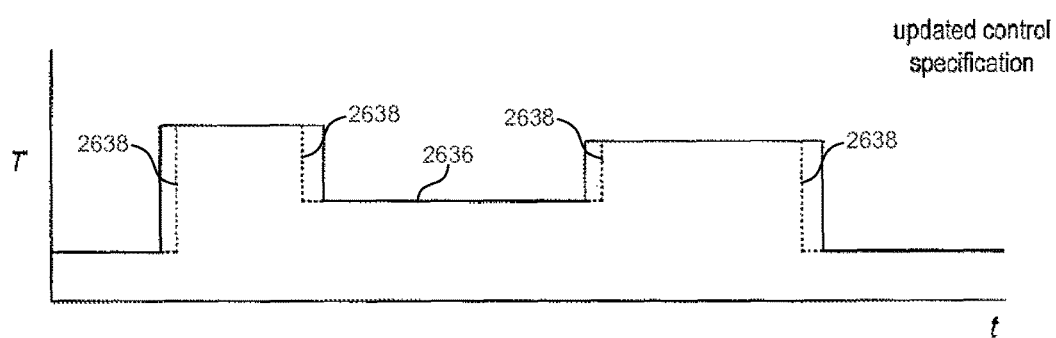
Figure 26F:
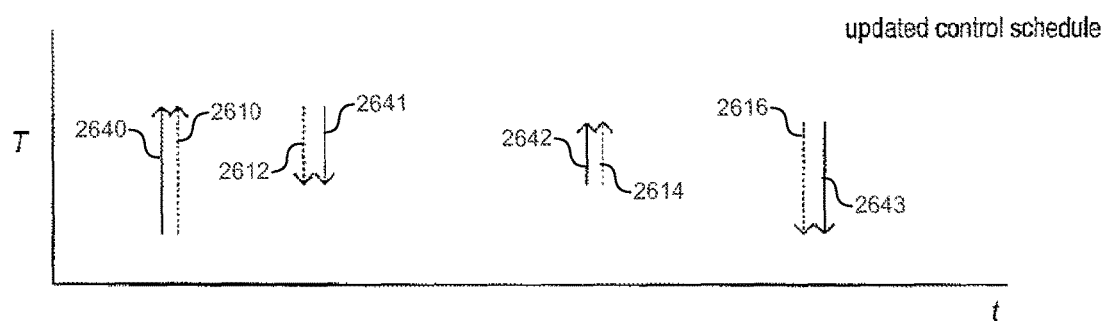

The operational data can be collected and sent over the Internet to a remote system, such as the remote system 1108 in FIG. 11, that stores, collects, and processes the data according the computational methods described above to confirm user-provided registration data, identify potential inaccuracies in user-provide registration data, or fill in missing registration data. Once the registration data for a user has been confirmed, corrected, or filled in, the remote system can process the registration data and operational data to determine an optimal control schedule for the intelligent thermostat. For example, the remote system use the registration data, operational data, and any other relevant data to update of intelligent-thermostat settings to more accurately coincide with the actual habits of occupants, changing weather conditions, or increase the energy efficiency of the HVAC system. For example, FIG. 26E illustrates a plot of an adjusted control specification based on the habits of dwelling occupants and a decrease in outside temperatures. For example, occupants may be present before the setpoint temperature increases as determined by motion sensors or the outside temperature may have dropped so that the heating unit has be started sooner in order to account for longer heating time needed to bring the indoor temperature up to a desired high temperature setting. Solid curve 2636 represents an updated control specification with longer periods for the higher temperature settings, dotted lines 2638 represent the previous control specification illustrated in FIG. 26A. FIG. 26F illustrates a plot of an updated control schedule that corresponds to the updated control schedule illustrated in FIG. 26A. The solid directional arrows 2640-2643 correspond to updated setpoints, or indications of desired temperature changes, at particular points in time as set by the remote system to better reflect the actual habits of occupants, changing weather conditions, or increase the energy efficiency of the HVAC system. Dashed directional arrows 2610, 2612, 2614, and 2616 represent setpoints that correspond to previous setpoints illustrated in FIG. 26B.

Although the current disclosure has been described in terms of particular examples, it is not intended that the current disclosure be limited to these examples. Modifications within the spirit of the disclosure will be apparent to those skilled in the art. For example, the computational methods can be distributed between the intelligent controller and the remote system. In particular, in FIG. 15A, the step 1506 "check registration data" can executed in the intelligent controller instead of the remote system. Because the remote system has access to the database of operational and registration data for a large number of similar intelligent controller users, the constants of Equations (1)-(16) or feed-forward neural network weights can be computed at the remote system and transmitted to the intelligent controller that, in turn, computes approximate registration data and approximate operational data in steps 1524 in FIG. 15B, step 1527 in FIG. 15C, and step 1535 in FIG. 15D. The method logic may include logic-circuit implementations, firmware, and computer-instruction-based routine and program implementations, all of which may vary depending on the selected values of a wide variety of different implementation and design parameters, including programming language, modular organization, hardware platform, data structures, control structures, and many other such design and implementation parameters.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer system comprising:
   one or more processors;
   one or more data-storage devices; and
   machine-readable instructions stored in one or more of the one or more data-storage devices that, when executed by the one or more processors, cause the one or more processors to perform operations comprising:
     receiving operational data generated by a thermostat;
     receiving registration data associated with the thermostat from the one or more data-storage devices;
     examining the registration data for defects;
     when the registration data includes defects:
       generating approximate registration data based on the operational data and a set of operational data and registration data collected from one or more similar thermostats, and
       correcting the defects in the registration data with corresponding approximate registration data;
     generating commands using the registration data; and
     sending the commands to the thermostat to control a heating, ventilation, and air conditioning (HVAC) system.

2. The computer system of claim 1, wherein examining the registration data for defects further comprises:
   examining the registration data for inconsistences between the registration data and the operational data; and
   examining the registration data for incomplete registration data.

3. The computer system of claim 2, wherein examining the registration data for inconsistencies further comprises:
   generating approximate operational data based on the registration data and the set of operational data and registration data collected from the number of similar thermostats; and
   comparing elements of the operational data with elements of the approximate operational data.

4. The computer system of claim 3, wherein generating the approximate operational data based on the registration data and the set of operational data and registration data collected from the one or more similar thermostats further comprises:
   calculating weights that relate the set of operational data and registration data collected from the one or more similar thermostats using a feed-forward neural network with back propagation; and
   calculating approximate operational data from the registration data and the weights.

5. The computer system of claim 1, wherein correcting the defects in the registration data with corresponding approximate registration data further comprises:
   when the registration data is inconsistent with the operational data, replacing inconsistent registration data elements with corresponding generated registration data elements; and
   when the registration data is incomplete, filling in missing registration data elements with corresponding approximate registration data elements.

6. The computer system of claim 1, wherein generating the approximate registration data based on the operational data and the set of operational data and registration data collected from the one or more similar thermostats further comprises:
   calculating weights that relate the set of operational data and registration data collected from the one or more similar thermostats using a feed-forward neural network with back propagation; and
   calculating approximate registration data from the operational data and the weights.

7. The computer system of claim 1, wherein the operational data further comprises data collected from thermostat sensors, control schedules, and data generated by the thermostat.

8. The computer system of claim 1, wherein the operations further comprise, when the registration data does not include defects, adding the operational data and registration data associated with the thermostat to the set of operational data and registration data collected from the one or more similar thermostats.

9. A method to be carried out by a computer system that includes one or more processors and one or more data-storage devices, the method comprising:
receiving operational data and registration data associated with a thermostat;
examining the registration data for defects;
when the registration data includes defects:
generating approximate registration data based on the operational data and a set of operational data and registration data collected from a number of similar thermostats, and
correcting the defects in the registration data with corresponding approximate registration data;
generating commands using the registration data; and
sending the commands to the thermostat to control a heating, ventilation, and air conditioning (HVAC) system.

10. The method of claim 9, wherein examining the registration data for defects further comprises:
examining the registration data for inconsistences between the registration data and the operational data; and
examining the registration data for incomplete registration data.

11. The method of claim 10, wherein examining the registration data for inconsistencies further comprises:
generating approximate operational data based on the registration data and the set of operational data and registration data collected from a number of similar thermostats; and
comparing elements of the operational data with elements of the approximate operational data.

12. The method of claim 11, wherein generating the approximate operational data based on the registration data and the set of operational data and registration data collected from the one or more similar thermostats further comprises:
calculating weights that relate the set of operational data and registration data collected from the one or more similar thermostats using a feed-forward neural network with back propagation; and
calculating approximate operational data from the registration data and the weights.

13. The method of claim 9, wherein correcting the defects in the registration data with the corresponding approximate registration data further comprises:
when the registration data is inconsistent with the operational data, replacing inconsistent registration data elements with corresponding generated registration data elements; and
when the registration data is incomplete, filling in missing registration data elements with corresponding approximate registration data elements.

14. The method of claim 9, wherein generating the approximate registration data based on the operational data and the set of operational data and registration data collected from the one or more similar thermostats further comprises:
calculating weights that relate the set of operational data and registration data collected from the one or more similar thermostats using a feed-forward neural network with back propagation; and
calculating approximate registration data from the operational data and the weights.

15. The method of claim 9, wherein the operational data further comprises data collected from thermostat sensors, control schedules, and data generated by the thermostat.

16. A non-transitory computer-readable medium having machine-readable instructions encoded thereon for enabling one or more processors to perform operations comprising:
receiving operational data and registration data from one or more memories, the operational data and registration data associated with a thermostat;
examining the registration data for defects;
when the registration data includes defects:
generating approximate registration data based on the operational data and a set of operational data and registration data collected from a number of similar thermostats, and
correcting the defects in the registration data with corresponding approximate registration data;
generating commands using the registration data; and
sending the commands to the thermostat to control a heating, ventilation, and air conditioning (HVAC) system.

17. The non-transitory computer-readable medium of claim 16, wherein generating the approximate registration data based on the operational data and the set of operational data and registration data collected from the one or more similar thermostats comprises:
calculating weights that relate the set of operational data and registration data collected from the one or more similar thermostats using a feed-forward neural network with back propagation; and
calculating approximate registration data from the operational data and the weights.

18. The non-transitory computer-readable medium of claim 16, wherein correcting the defects in the registration data with corresponding approximate registration data comprises:
when the registration data is inconsistent with the operational data, replacing inconsistent registration data elements with corresponding generated registration data elements; and
when the registration data is incomplete, filling in missing registration data elements with corresponding approximate registration data elements.

* * * * *